United States Patent
Mohammad Soleymani et al.

(10) Patent No.: US 12,048,053 B2
(45) Date of Patent: Jul. 23, 2024

(54) RESOURCE SELECTION FOR POWER-SAVING USERS IN NR SIDELINK

(71) Applicant: Fraunhofer-Gesellschaft zur Förderung der angewandten Forschung e.V., Munich (DE)

(72) Inventors: Dariush Mohammad Soleymani, Erlangen (DE); Elke Roth-Mandutz, Erlangen (DE); Shubhangi Bhadauria, Erlangen (DE); Mehdi Harounabadi, Erlangen (DE); Dietmar Lipka, Erlangen (DE); Martin Leyh, Erlangen (DE)

(73) Assignee: FRAUNHOFER-GESELLSCHAFT ZUR FÖRDERUNG DER ANGEWANDTEN FORSCHUNG E.V., Munich (DE)

( * ) Notice: Subject to any disclaimer, the term of this patent is extended or adjusted under 35 U.S.C. 154(b) by 0 days.

(21) Appl. No.: 18/474,368

(22) Filed: Sep. 26, 2023

(65) Prior Publication Data

US 2024/0015845 A1    Jan. 11, 2024

Related U.S. Application Data

(63) Continuation of application No. PCT/EP2022/057792, filed on Mar. 24, 2022.

(30) Foreign Application Priority Data

Mar. 31, 2021 (EP) .................................... 21166426

(51) Int. Cl.
*H04W 76/28* (2018.01)
*H04W 52/02* (2009.01)
*H04W 72/02* (2009.01)

(52) U.S. Cl.
CPC ........... *H04W 76/28* (2018.02); *H04W 72/02* (2013.01); *H04W 52/02* (2013.01)

(58) Field of Classification Search
CPC ...... H04W 76/28; H04W 72/02; H04W 52/02
See application file for complete search history.

(56) References Cited

U.S. PATENT DOCUMENTS

| | | | |
|---|---|---|---|
| 2019/0075548 A1 | 3/2019 | Lee et al. | |
| 2022/0046746 A1* | 2/2022 | Yang | H04W 52/0216 |

FOREIGN PATENT DOCUMENTS

| | | |
|---|---|---|
| WO | 2021/185957 A1 | 9/2021 |
| WO | 2021/258398 A1 | 12/2021 |

(Continued)

OTHER PUBLICATIONS

International Search Report and Written Opinion dated Aug. 9, 2022, issued in application No. PCT/EP2022/057792.

(Continued)

*Primary Examiner* — Ayanah S George
(74) *Attorney, Agent, or Firm* — McClure, Qualey & Rodack, LLP

(57) ABSTRACT

A user device, UE, for a wireless communication network is described. The wireless communication network including a plurality of user devices, UEs. The UE communicates with one or more further user devices, UEs, of the wireless communication network over a sidelink. Responsive to a trigger for a transmission, the UE performs a sensing process for determining resources to be used for the transmission. The sensing process includes a plurality of radio resource selection processes. The UE selects from the plurality of radio resource selection processes the radio resource selection process to be applied dependent on one or more of the following:
a traffic density,
a traffic density of different types of traffic,
a user density within a predefined area around the UE.

11 Claims, 7 Drawing Sheets

(56) References Cited

FOREIGN PATENT DOCUMENTS

| WO | WO-2022018690 A2 * | 1/2022 | ............ H04W 4/08 |
|---|---|---|---|
| WO | 2022/026322 A1 | 2/2022 | |
| WO | WO-2022026322 A1 * | 2/2022 | ............ H04W 72/02 |

OTHER PUBLICATIONS

3GPP 36.213; "Evolved Universal Terrestrial Radio Access, Physical layer procedures;" V15.8.0; Dec. 2019; pp. 1-553.

3GPP TS 38.214; "Physical layer procedures for data (Release 16);" V16.4.0; Dec. 2020; pp. 1-169.

LG Electronics; "New WID on NR sidelink enhancement;" 3GPP TSG RAN Meeting #86; Dec. 2019; pp. 1-6.

3GPP 38.321; "Medium Access Control (MAC) protocol specification, Release 16;" V16.3.0; Dec. 2020; pp. 1-156.

Xinwei; "Discussion on partial sensing of pedestrian UEs;" 3GPP TSG RAN WG1 Meeting #86bis; vol. RAN WG1 XP051149716; Oct. 2016; pp. 1-4.

Intel Corporation; "Design of UE Sidelink Power Saving Solutions;" 3GPP TSG RAN WG1 Meeting #104-E; vol. RAN WG1 XP051971142; Feb. 2021; pp. 1-19.

3GPP; RP-210279; "Status Report to TSG;" XP051985638; Mar. 2021; pp. 1-17.

Fraunhofer IIS; et al.; "NR Sidelink Resource Allocation for UE Power Saving;" 3GPP TSG RAN WG1 Meeting #103-e; XP051941588; Nov. 2020; pp. 1-8.

Nokia Networks; "Connected mode eDRX operation;" 3GPP TSG RAN WG1 Meeting #91bis; XP051005007; Oct. 2015; pp. 1-2.

MCC Support; "Final Report of 3GPP TSG RAN WG1 #103-e v1.0.0;" 3GPP TSG RAN WG1 Meeting #104-e; Jan.-Feb. 2021; pp. 1-235.

Korean language Notice of Allowance dated Feb. 20, 2024, issued in application No. KR 10-2023-7036941.

English language translation of Notice of Allowance dated Feb. 20, 2024 (pp. 1-2 of attachment).

Fujitsu; "Considerations on Partial Sensing and DRX in NR V2X;" 3GPP TSG RAN WG1 Meeting #104-e; Jan. 2021; pp. 1-23.

VIVO; "Enhancements on Multi TRP, PUCCH and PUSCH;" 3GPP TSG RAN WG1 #104-e; Jan. 2021; pp. 1-28.

Japanese language office action dated Apr. 30, 2024, issued in application No. JP 2023-560717.

English language translation of office action dated Apr. 30, 2024 (pp. 1-6 of attachment).

LG Electronics; "Discussion on physical layer design considering sidelink DRX operation;" 3GPP TSG RAN WG1 #103-e R1-2007897; Nov. 2020; pp. 1-17.

* cited by examiner

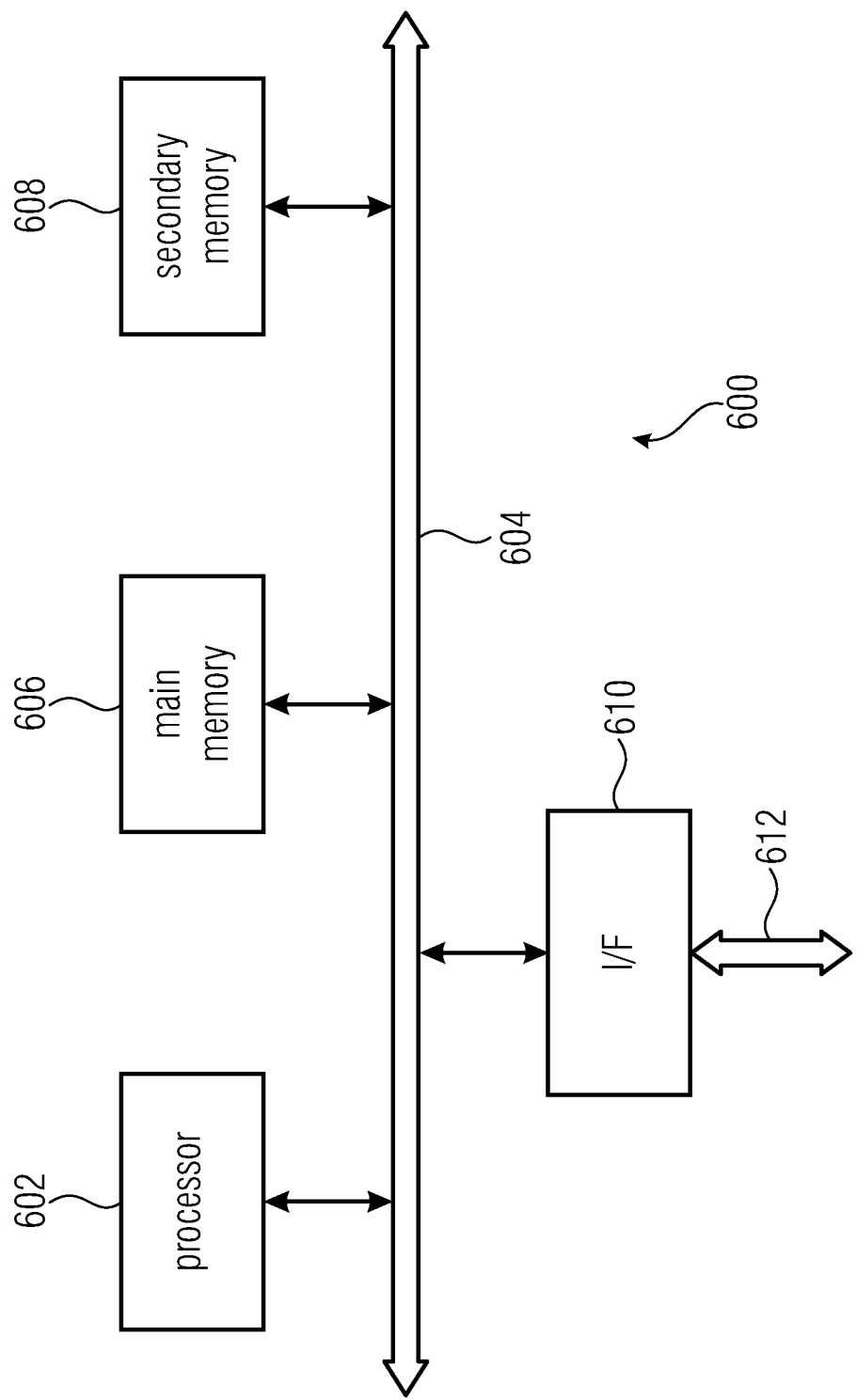

ial Application No. PCT/EP2022/057792, filed Mar. 24, 2022, which is incorporated herein by reference in its entirety, and additionally claims priority from European Application No. EP21166426.3, filed Mar. 31, 2021, which is also incorporated herein by reference in its entirety.

The present application concerns the field of wireless communication systems or networks, more specifically, a communication among user devices, UE, of the wireless communication network using the sidelink, SL.

BACKGROUND OF THE INVENTION

FIG. 1 is a schematic representation of an example of a terrestrial wireless network 100 including, as is shown in FIG. 1(a), the core network 102 and one or more radio access networks $RAN_1$, $RAN_2$, ... $RAN_N$. FIG. 1(b) is a schematic representation of an example of a radio access network $RAN_n$ that may include one or more base stations $gNB_1$ to $gNB_5$, each serving a specific area surrounding the base station schematically represented by respective cells $106_1$ to $106_5$. The base stations are provided to serve users within a cell. The one or more base stations may serve users in licensed and/or unlicensed bands. The term base station, BS, refers to a gNB in 5G networks, an eNB in UMTS/LTE/LTE-A/LTE-A Pro, or just a BS in other mobile communication standards. A user may be a stationary device or a mobile device. The wireless communication system may also be accessed by mobile or stationary IoT devices which connect to a base station or to a user. The mobile or stationary devices may include physical devices, ground based vehicles, such as robots or cars, aerial vehicles, such as manned or unmanned aerial vehicles, UAVs, the latter also referred to as drones, buildings and other items or devices having embedded therein electronics, software, sensors, actuators, or the like as well as network connectivity that enables these devices to collect and exchange data across an existing network infrastructure. FIG. 1(b) shows an exemplary view of five cells, however, the $RAN_n$ may include more or less such cells, and $RAN_n$ may also include only one base station. FIG. 1(b) shows two users $UE_1$ and $UE_2$, also referred to as user device or user equipment, that are in cell $106_2$ and that are served by base station $gNB_2$. Another user $UE_3$ is shown in cell $106_4$ which is served by base station $gNB_4$. The arrows $108_1$, $108_2$ and $108_3$ schematically represent uplink/downlink connections for transmitting data from a user $UE_1$, $UE_2$ and $UE_3$ to the base stations $gNB_2$, $gNB_4$ or for transmitting data from the base stations $gNB_2$, $gNB_4$ to the users $UE_1$, $UE_2$, $UE_3$. This may be realized on licensed bands or on unlicensed bands. Further, FIG. 1(b) shows two further devices $110_1$ and $110_2$ in cell $106_4$, like IoT devices, which may be stationary or mobile devices. The device $110_1$ accesses the wireless communication system via the base station $gNB_4$ to receive and transmit data as schematically represented by arrow $112_1$. The device $110_2$ accesses the wireless communication system via the user $UE_3$ as is schematically represented by arrow $112_2$. The respective base station $gNB_1$ to $gNB_5$ may be connected to the core network 102, e.g. via the S1 interface, via respective backhaul links $114_1$ to $114_5$, which are schematically represented in FIG. 1(b) by the arrows pointing to "core". The core network 102 may be connected to one or more external networks. The external network may be the Internet, or a private network, such as an Intranet or any other type of campus networks, e.g. a private WiFi communication system or a 4G or 5G mobile communication system. Further, some or all of the respective base station $gNB_1$ to $gNB_5$ may be connected, e.g. via the S1 or X2 interface or the XN interface in NR, with each other via respective backhaul links $116_1$ to $116_5$, which are schematically represented in FIG. 1(b) by the arrows pointing to "gNBs". A sidelink channel allows direct communication between UEs, also referred to as device-to-device, D2D, communication. The sidelink interface in 3GPP is named PC5.

For data transmission a physical resource grid may be used. The physical resource grid may comprise a set of resource elements to which various physical channels and physical signals are mapped. For example, the physical channels may include the physical downlink, uplink and sidelink shared channels, PDSCH, PUSCH, PSSCH, carrying user specific data, also referred to as downlink, uplink and sidelink payload data, the physical broadcast channel, PBCH, carrying for example a master information block, MIB, and one or more system information blocks, SIBs, one or more sidelink information blocks, SLIBs, if supported, the physical downlink, uplink and sidelink control channels, PDCCH, PUCCH, PSSCH, carrying for example the downlink control information, DCI, the uplink control information, UCI, and the sidelink control information, SCI, and physical sidelink feedback channels, PSFCH, carrying PC5 feedback responses. The sidelink interface may support a 2-stage SCI which refers to a first control region containing some parts of the SCI, also referred to as the $1^{st}$ stage SCI, and optionally, a second control region which contains a second part of control information, also referred to as the $2^{nd}$ stage SCI.

For the uplink, the physical channels may further include the physical random-access channel, PRACH or RACH, used by UEs for accessing the network once a UE synchronized and obtained the MIB and SIB. The physical signals may comprise reference signals or symbols, RS, synchronization signals and the like. The resource grid may comprise a frame or radio frame having a certain duration in the time domain and having a given bandwidth in the frequency domain. The frame may have a certain number of subframes of a predefined length, e.g. 1ms. Each subframe may include one or more slots of 12 or 14 OFDM symbols depending on the cyclic prefix, CP, length. A frame may also have a smaller number of OFDM symbols, e.g. when utilizing shortened transmission time intervals, sTTI, or a mini-slot/non-slot-based frame structure comprising just a few OFDM symbols.

The wireless communication system may be any single-tone or multicarrier system using frequency-division multiplexing, like the orthogonal frequency-division multiplexing, OFDM, system, the orthogonal frequency-division multiple access, OFDMA, system, or any other Inverse Fast Fourier Transform, IFFT, based signal with or without Cyclic Prefix, CP, e.g. Discrete Fourier Transform-spread-OFDM, DFT-s-OFDM. Other waveforms, like non-orthogonal waveforms for multiple access, e.g. filter-bank multicarrier, FBMC, generalized frequency division multiplexing, GFDM, or universal filtered multi carrier, UFMC, may be used. The wireless communication system may operate, e.g., in accordance with the LTE-Advanced pro standard, or the 5G or NR, New Radio, standard, or the NR-U, New Radio Unlicensed, standard.

The wireless network or communication system depicted in FIG. 1 may be a heterogeneous network having distinct overlaid networks, e.g., a network of macro cells with each macro cell including a macro base station, like base station gNBi to gNB$_5$, and a network of small cell base stations, not shown in FIG. 1, like femto or pico base stations. In addition to the above described terrestrial wireless network also non-terrestrial wireless communication networks, NTN, exist including spaceborne transceivers, like satellites, and/or airborne transceivers, like unmanned aircraft systems. The non-terrestrial wireless communication network or system may operate in a similar way as the terrestrial system described above with reference to FIG. 1, for example in accordance with the LTE-Advanced Pro standard or the 5G or NR, new radio, standard.

In mobile communication networks, for example in a network like that described above with reference to FIG. 1, like a LTE or 5G/NR network, there may be UEs that communicate directly with each other over one or more sidelink, SL, channels, e.g., using the PC5/PC3 interface or WiFi direct. UEs that communicate directly with each other over the sidelink may include vehicles communicating directly with other vehicles, V2V communication, vehicles communicating with other entities of the wireless communication network, V2X communication, for example roadside units, RSUs, roadside entities, like traffic lights, traffic signs, or pedestrians. An RSU may have a functionality of a BS or of a UE, depending on the specific network configuration. Other UEs may not be vehicular related UEs and may comprise any of the above-mentioned devices. Such devices may also communicate directly with each other, D2D communication, using the SL channels. When considering two UEs directly communicating with each other over the sidelink, e.g., using the PC5/PC3 interface, one of the UEs may also be connected with a BS, and may relay information from the BS to the other UE via the sidelink interface and vice-versa. The relaying may be performed in the same frequency band, in-band-relay, or another frequency band, out-of-band relay, may be used. In the first case, communication on the Uu and on the sidelink may be decoupled using different time slots as in time division duplex, TDD, systems.

FIG. 2 is a schematic representation of an in-coverage scenario in which two UEs directly communicating with each other are both connected to a base station. The base station gNB has a coverage area that is schematically represented by the circle 200 which, basically, corresponds to the cell schematically represented in FIG. 1. The UEs directly communicating with each other include a first vehicle 202 and a second vehicle 204 both in the coverage area 200 of the base station gNB. Both vehicles 202, 204 are connected to the base station gNB and, in addition, they are connected directly with each other over the PC5 interface. The scheduling and/or interference management of the V2V traffic is assisted by the gNB via control signaling over the Uu interface, which is the radio interface between the base station and the UEs. In other words, the gNB provides SL resource allocation configuration or assistance for the UEs, and the gNB assigns the resources to be used for the V2V communication over the sidelink. This configuration is also referred to as a mode 1 configuration in NR V2X or as a mode 3 configuration in LTE V2X.

FIG. 3 is a schematic representation of an out-of-coverage scenario in which the UEs directly communicating with each other are either not connected to a base station, although they may be physically within a cell of a wireless communication network, or some or all of the UEs directly communicating with each other are connected to a base station but the base station does not provide for the SL resource allocation configuration or assistance. Three vehicles 206, 208 and 210 are shown directly communicating with each other over a sidelink, e.g., using the PC5 interface. The scheduling and/or interference management of the V2V traffic is based on algorithms implemented between the vehicles. This configuration is also referred to as a mode 2 configuration in NR V2X or as a mode 4 configuration in LTE V2X. As mentioned above, the scenario in FIG. 3 which is the out-of-coverage scenario does not necessarily mean that the respective mode 2 UEs in NR or mode 4 UEs in LTE are outside of the coverage 200 of a base station, rather, it means that the respective mode 2 UEs in NR or mode 4 UEs in LTE are not served by a base station, are not connected to the base station of the coverage area, or are connected to the base station but receive no SL resource allocation configuration or assistance from the base station. Thus, there may be situations in which, within the coverage area 200 shown in FIG. 2, in addition to the NR mode 1 or LTE mode 3 UEs 202, 204 also NR mode 2 or LTE mode 4 UEs 206, 208, 210 are present. In addition, FIG. 3, schematically illustrates an out of coverage UE using a relay to communicate with the network. For example, the UE 210 may communicate over the sidelink with UE 212 which, in turn, may be connected to the gNB via the Uu interface. Thus, UE 212 may relay information between the gNB and the UE 210

Although FIG. 2 and FIG. 3 illustrate vehicular UEs, it is noted that the described in-coverage and out-of-coverage scenarios also apply for non-vehicular UEs. In other words, any UE, like a hand-held device, communicating directly with another UE using SL channels may be in-coverage and out-of-coverage.

It is noted that the information in the above section is only for enhancing the understanding of the background of the invention and, therefore, it may contain information that does not form conventional technology that is already known to a person of ordinary skill in the art.

SUMMARY

An embodiment may have a user device, UE, for a wireless communication system, the wireless communication system including a plurality of user devices, UEs, wherein the UE is to communicate with one or more further user devices, UEs, of the wireless communication network over a sidelink, wherein the UE is to operate in a Discontinuous Reception, DRX, mode, wherein, responsive to a trigger for a transmission, the UE is to perform a sensing process for determining resources to be used for the transmission, and wherein the UE is to receive a signaling including a parameter causing, responsive to the trigger for the transmission, an extension of a default ON duration of the DRX cycle in accordance with a sensing window for the sensing process, the sensing window having a size or duration mandated by the triggered transmission.

Another embodiment may have a wireless communication system including one or more inventive user devices, UEs.

According to another embodiment, a method for operating a user device, UE, for a wireless communication system, the wireless communication system including a plurality of user devices, UEs, wherein the UE is to communicate with one or more further user devices, UEs, of the wireless communication network over a sidelink, and wherein the UE is to operate in a Discontinuous Reception, DRX, mode, may have the steps of: responsive to a trigger for a transmission, performing a sensing process for determining resources to be used for the transmission, and receiving a signaling including a parameter causing, responsive to the trigger for the transmission, an extension of a default ON duration of the DRX cycle in accordance with a sensing window for the sensing process, the sensing window having a size or duration mandated by the triggered transmission.

According to another embodiment, a method for operating a user device, UE, for a wireless communication system, the wireless communication system including a plurality of user devices, UEs, herein the UE is to communicate with one or more further user devices, UEs, of the wireless communication network over a sidelink, and wherein the UE is to operate in a Discontinuous Reception, DRX, mode, may have the steps of: responsive to a trigger for a transmission, performing a sensing process for determining resources to be used for the transmission, the sensing process including a continuous partial sensing-based radio resource selection process, and adapting a contiguous sensing window so as to start the continuous partial sensing-based radio resource selection process during a DRX OFF duration prior to a start of a DRX ON duration.

Another embodiment may have a non-transitory digital storage medium having a computer program stored thereon to perform any of the inventive methods when said computer program is run by a computer

BRIEF DESCRIPTION OF THE DRAWINGS

Embodiments of the present invention will be detailed subsequently referring to the appended drawings, in which:

FIG. 1 is a schematic representation of an example of a terrestrial wireless network, wherein

FIG. 8 illustrates an example of a computer system on which units or modules as well as the steps of the methods described in accordance with the inventive approach may execute.

DETAILED DESCRIPTION OF THE INVENTION

Embodiments of the present invention are now described in more detail with reference to the accompanying drawings, in which the same or similar elements have the same reference signs assigned.

Figure 1A:
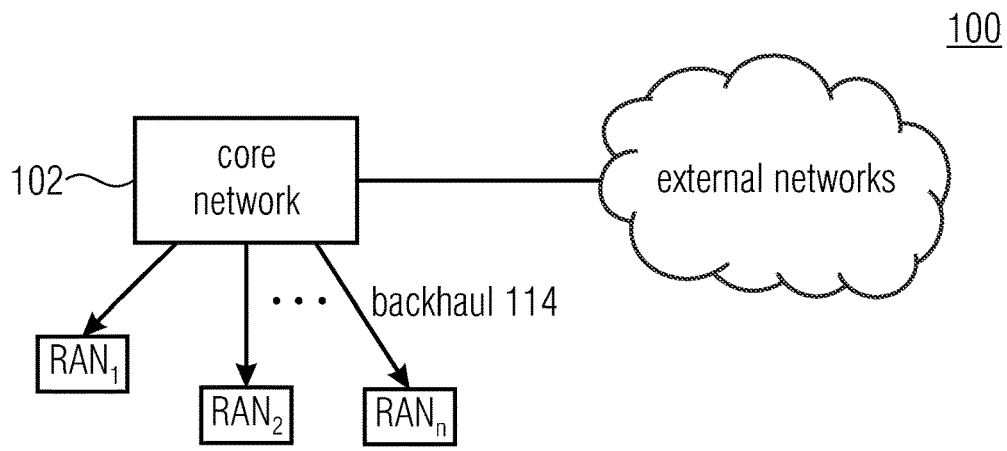
FIG. 1(a) illustrates a core network and one or more radio access networks.
Figure 1B:
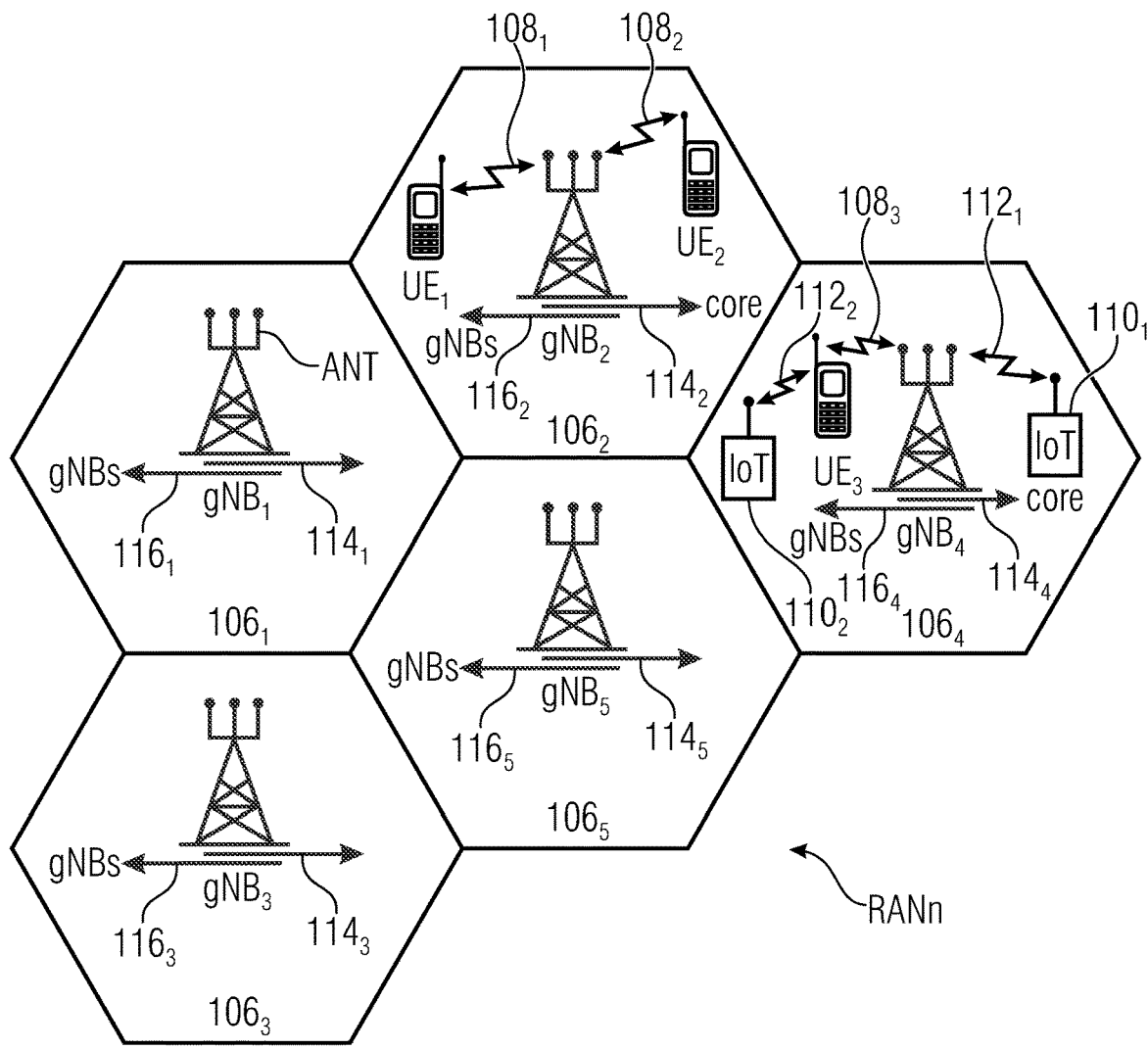
FIG. 1(b) is a schematic representation of an example of a radio access network RAN.
Figure 2:
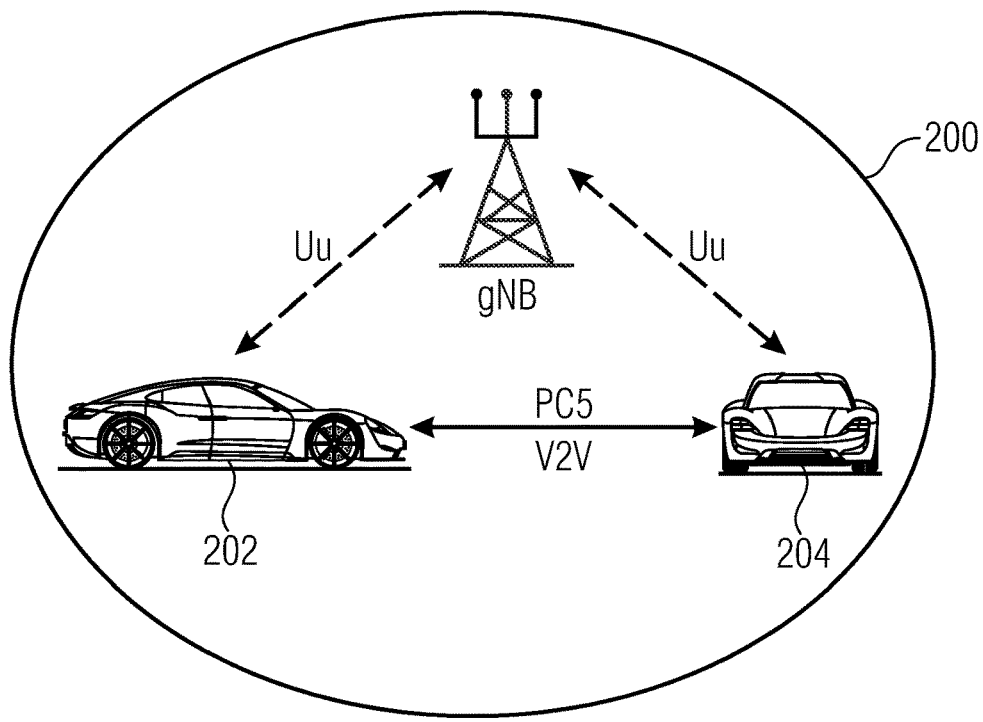
FIG. 2 is a schematic representation of an in-coverage scenario in which two UEs directly communicating with each other are both connected to a base station.
Figure 3:
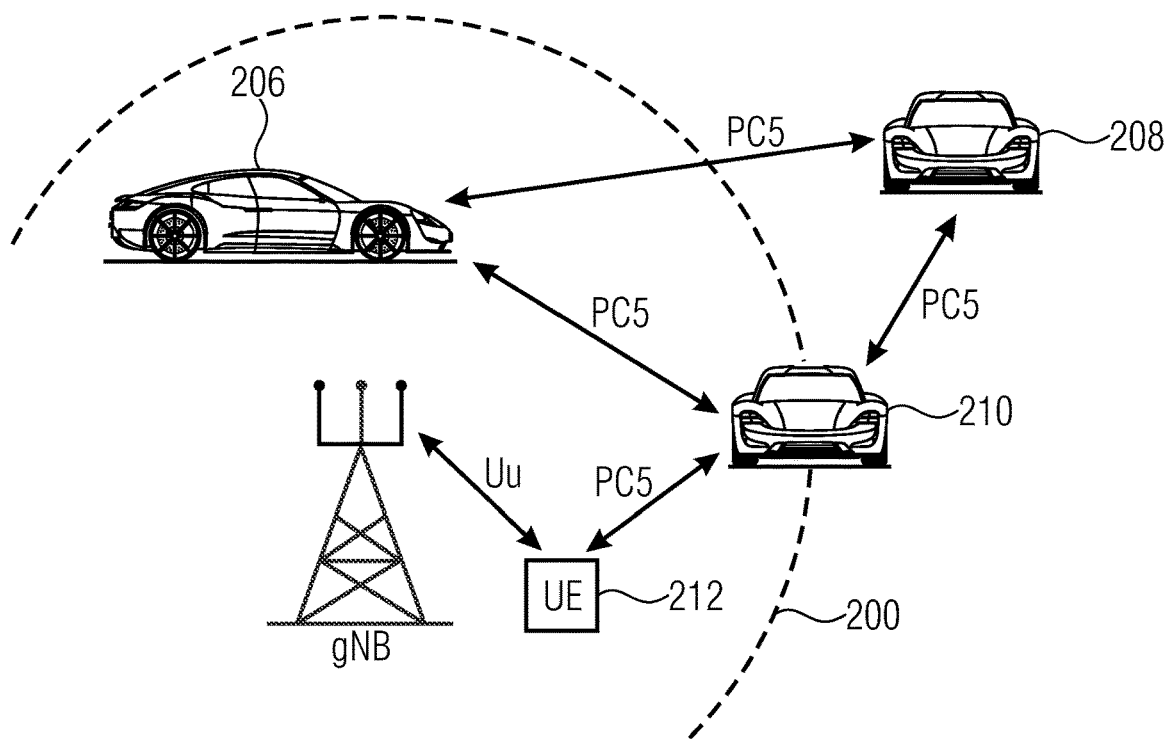
FIG. 3 is a schematic representation of an out-of-coverage scenario in which the UEs directly communicating with each other.

In a wireless communication system or network, like the one described above with reference to FIG. 1 or FIG. 2 or FIG. 3, user devices, UE may communicate via the sidelink, SL. For example, in an out-of-coverage scenario as described with reference to FIG. 4, per 3GPP Release 16 for NR Sidelink, a UE, like a vehicular UE, V-UE, has to perform sensing continuously to recognize unoccupied radio resources in the time domain and in the frequency domain for an arrived transport block, TB, i.e., a TB that arrived at the V-UE, e.g., from an application or service executed by the V-UE, and is to be transmitted over the SL such that an associated delay budget and associated reliability requirements are met. However, an increasing number of user devices using sidelink communications are UEs with a limited battery life, e.g., pedestrian users, cyclists, electric cars, so that the current sensing-based resource selection approach is challenging for such UEs in terms of power consumption or power efficiency of the radio resource selection procedure to be applied.

Figure 4:
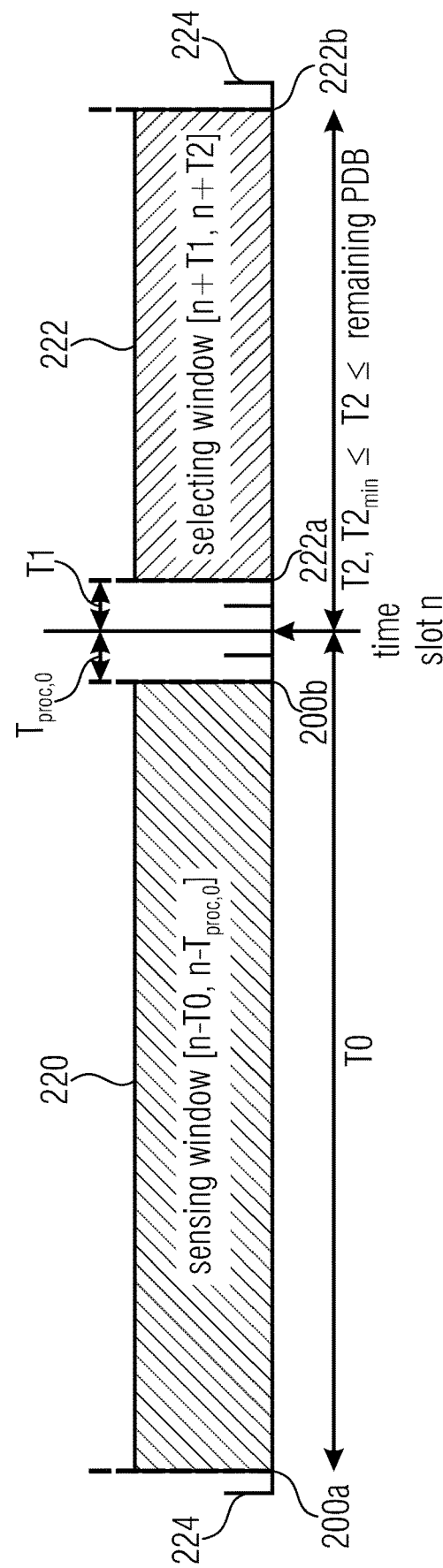
FIG. 4 illustrates a sensing process be performed by a UE autonomously selecting resources for a transmission.

FIG. 4 illustrates a sensing process that may be performed by a UE for autonomously selecting resources. FIG. 4 illustrates a sensing window 220 with its the start 220a and its end 220b, as well as a selection window 222 with its start 222a and its end 222b. A plurality of time slots 224 are illustrated, and it may be seen that the sensing window 220 as well as the selection window 222 spans a certain number of time slots 224. FIG. 4 further illustrates at 226 the time slot n, which is the time slot at which a transmission to be performed by the UE is triggered. Note that the UE does not necessarily has to perform sensing during the whole sensing window, but may be configured to only perform partial sensing using sub-intervals, periodic or aperiodic, within the sensing window. The reason for this might be that the UE has to perform power saving and may rely on a subset of sensing results.

For example, the trigger may be that the UE determines that a buffer includes data or a data packet to be transmitted, so that responsive to this determination or trigger, at the time slot n, the UE selects resources to be used for the transmission of the data or packet in the transmit buffer. The selection is based on resource information obtained during the sensing window 220. In accordance with other examples, the transmission of data at time slot n may be triggered by the following events:

from a Medium Access Control, MAC, layer perspective, when a protocol data unit, PDU, is generated by the MAC layer and is made available to the physical, PHY, layer, from an application layer perspective, when an event, ranging from the availability of sensor information to be shared to an untoward incident, like an accident, generates data that needs to be transmitted.

The process of sensing is where a Mode 2 UE takes into account, for example, first stage SCIs received from other UEs so as to identify resources that have been reserved by these other UEs in the recent past. The UE also measures the sidelink, SL, Reference Signal Received Power, RSRP, in the time slots defining the sensing window 220 so as to determine interference levels if the UE were to transmit using these resources. This enables the UE to identify resources which are available for the transmission as well as resources that are not available for the transmission. When the UE intends to carry out the transmission, for example responsive to the trigger event at time slot n, the process of resource selection is triggered where the UE considers the sensing results over a time period in the past, prior to the triggering of the transmission or the resource selection. The just-mentioned time period in the past is the sensing window 220 which is the time period within which the UE considers the sensing results in order to determine possible resources for the transmission. As is illustrated in FIG. 4, the sensing window 220 commences a certain time 220a in the past with reference to the time slot n at which the transmission is triggered. The time period from the time slot n at which the sensing window 220 commences is the time $T_0$ that has a certain configured or preconfigured length of, for example, 1100 ms or only 100 ms. The sensing window 220, in the example of FIG. 4, concludes at 220b shortly before the selection process or transmission is triggered at time slot n. The time period between the end of the sensing window 220 and the time slot n is indicated in FIG. 4 as $T_{proc,0}$. In accordance with other examples, the sensing window may conclude immediately at the time slot n so that $T_{proc,0}=0$. Thus, the duration of the sensing window may be defined by [n−T0, n−$T_{proc,0}$].

$T_0$ may be defined by higher layers, for example by a resource pool, RP, configuration using the parameter sL-SensingWindow-r16. T0 may be between 100 ms and 1100 ms. $T_{proc,0}$ may be defined as indicated in the following table, dependent on the subcarrier spacing used in the resource pool.

| $\mu_{SL}$ | $T_{proc,0}$ [slots] |
|---|---|
| 0 | 1 |
| 1 | 1 |
| 2 | 2 |
| 3 | 4 |

The results generated by the sensing process are called sensing results. The sensing results indicate for a set of time and frequency resources whether certain resources are available and/or unavailable for a transmission. The indicated resources may be within a specific resource pool, like a sidelink resource pool of the wireless communication system, and are spread over a specific duration of time in the past, namely the sensing window 220. The sidelink resource pool may be a transmit resource pool, a receive resource pool, an exceptional resource pool, a resource pool used for Mode 1 or a resource pool used for Mode 2.

On the basis of the information obtained by the sensing process, the UE, for the transmission triggered at time slot n, selects resources within the selection window 222. As it is depicted in FIG. 4, the selection window begins 222a shortly after the transmission or resource selection trigger, for example at a time period T1 following time slot n. In other examples, the selection window 222 may start immediately at time slot n so that T1=0. The end 222b of the selection window is the time T2 that is determined, for example by the packet delay budget, PDB, associated with the data or packet or transport bock, TB, that is to be transmitted by the UE. The selection window 222 is the time period within which the UE selects resources by taking into account the sensing information, extrapolating the available resources based on the sensing information to generate a candidate resource set, and selecting resources from within the candidate resource set for the transmission triggered.

The duration of the selection window 222 may be defined by [n+T1, n+T2], where T1 and T2 may be defined in accordance with the UE implementation. $T_1$ may as follows: 0<T1<$T_{proc,1}$, where $T_{proc,1}$ may be defined as shown in the following table with reference to the subcarrier spacing used for the resource pool from the which the resources for the transmission are selected.

| $\mu_{SL}$ | $T_{proc,1}$ [slots] |
|---|---|
| 0 | 3 |
| 1 | 5 |
| 2 | 9 |
| 3 | 17 |

$T_2$ may be defined based on the packet delay budget, PDB, and $T2_{min}$, which may be defined by higher layers, for example, using a resource pool, RP, configuration, by the parameter SL-SelectionWindow-r16, may take a value between 1, 5, 10 and 20 milliseconds, dependent on a priority of the data or packet to be transmitted by the UE. For example, in case $T_2$<remaining PDB, the following holds:
  if T2<remaining PDB, $T2_{min}$≤T2≤remaining PDB
  else, T2=remaining PDB With the sensing and selection windows defined, the UE autonomously selects resources as follows. All resources within the selection window 222 are initially considered candidate resources that may be used by the UE for a transmission.

Hence, the UE gathers all the resources within the one or more time slots and the one or more sub-channels to form a candidate resource set $S_A$ and the size of the candidate resource set $S_A$, based on the number of resources within the set, is given by $M_{total}$. The UE then proceeds to exclude certain resources from the candidate resource set until it arrives at a final candidate resource set, referred to as $S_B$. The number of resources in the final candidate resource set $S_B$ may be less than the number of resources $M_{total}$ in the original candidate resource set $S_A$.

The resources may be excluded in case a certain condition exists. For example, when the UE is transmitting another transmission at a given time slot so that it has not received anything due to half-duplex constraint, resources from the given time slot are excluded from the initial candidate resource set $S_A$. In case any received SCI indicates a resource reservation period, the UE excludes any future resources indicated by the reservation period from the initial candidate resource set $S_A$. When an RSRP measurement on a certain resource is higher than a threshold, like a SL-RSRP threshold, that may be set using a priority value received in an SCI and a priority value associated with the triggered invention, the UE excludes such a resource from the initial candidate resource set $S_A$. Resources that are indicated in the received SCI and are extrapolated for future periodic transmissions may also be excluded.

In case the final candidate resource set $S_B$ is less than a certain percentage of the total number of resources available in the selection window, it is determined that there are not sufficient resources from which the UE may select those for performing the triggered transmission. In such a case, the UE reduces the SL-RSRP threshold and repeats the selection process on the basis of any one of the above conditions. The just-mentioned percentage may be referred to by X, and the size of the final candidate set is not to be less than X·$M_{total}$. Once the final candidate resource set $S_B$ is decided by the UE, the UE sends this final candidate resource set $S_B$ to the higher layers which, e.g. based on a uniform distribution, selects a needed number of resources from the final candidate resource set $S_B$, and those selected resources are then used by the UE for the triggered transmission.

For example, for the LTE V2X Mode 4 (see 3GPP 36.213) and for the NR V2X Mode 2 (see 3GPP 38.214), the following radio resource selection procedures are undertaken:

a random radio resource selection,
a regular sensing-based radio resource selection, and
a partial sensing-based radio resource selection When the random radio resource selection is configured by higher layer signaling, a user transmits on the bandwidth part configured. The resource selection procedure is specified in 3GPP 38.214 as follows:

1. A candidate resource set, $R_{x,y}$, is a set of L contiguous sub-channels, x+j, where j=0, . . . , L−1 is a set of contiguous sub-channels, in a subframe at a time $t_m$ within the time interval [n+T1, n+T2]. The time stamp n is the packet arrival time. T1 and T2 are the processing time and the packet delay budget, respectively. The T1 and T2 values depend on the UE implementation and are to meet the following conditions:
   a. T1≤4 and $T2_{min}$(priority of TX)≤T2≤100, where the higher layer provides the priority of TX, otherwise $T2_{min}$ is set to 20.
2. A set of all configured frequency-time resources Sa is initialized, and an empty set of Sb is created.
3. The UE selects a set of subframe resources $R_{x,y}$ needed for its transmission from the set Sa into set Sb.
4. The UE sends the Sb list to the higher layer.

When the higher layer configures partial sensing, then the UE performs the candidate radio resource selection according to 3GPP 36.213 as follows:

1. A candidate resource set, $R_{x,y}$, is a set of L contiguous sub-channels, x+j, where j=0, . . . , L−1 is a set of contiguous sub-channels, in a subframe at a time $t_m$ within the time interval [n+T1, n+T2]. The time stamp n is the packet arrival time.
   The UE selects y subframes within time interval [n+T1, n+T2] wherein y depends on the UE implementation. The higher layer signaling configures T1, T2; their values depending on the UE implementation. T2 is a value between $T2_{min}$(priority of TX) and 100 ms. $T2_{min}$ is configured by higher layer signaling otherwise $T2_{min}$ is 20 ms by default. Besides, the upper bound of T2 depends on the maximum delay that a packet is allowed to wait in the UE buffer before transmission. y is to fulfill the higher layer parameter minNumCandidateSF within $M_{total}$, wherein the $M_{total}$ is a total number of subframe resources.
2. The UE monitors all $t_{y-k}*P_{step}$ subframe resources, where k is the gapCandidatesensing with 10 bits which is configured by the higher layer signaling. $P_{step}$ is a step size between two consecutive sensing time instances that is configured.
3. A bit set to 1 represents the sensing time instances monitored by a P-UE when partial sensing is configured.
4. The parameter Th(a,b) is configured differently per priority requirements of the applications by the higher layer.
5. Sa is a list of all radio resource subframes and Sb is an empty set.
6. The UE excludes any subframe resources from the set Sa that meet all of the following conditions:
   a. The UE decodes a SCI format 1 indicating a resource reservation and a priority, i.e., include the fields 'resource reservation' and 'priority'. The parameter priorx is derived from the "priority" field.
   b. The m Measured PSSCH-RSSP is higher than a Th(priotx,priorx) value.
   c. The UE receives a SCI format 1 at subframe $t_{m+q}*P_{step}*Prsvp_{RX}$, indicating the number of reserved resources with a higher priority that overlaps with $R_{x,y+j}*P'rsvp_{TX}$, where q=1,2, . . . , Q and j=0,1, . . . , Cresel−1. The value Q=1/$Prsvp_{RX}$ if $Prsvp_{RX}$<1 and y−m≤Pstep*$Prsvp_{RX}$+Pstep and if ty is the last subframe of the Y subframes, Q=1. Where $P'rsvp_{TX}$ and $P'rsvp_{RX}$ are reserved resources indicated by the transmitter and receiver users, respectively. $C_{resel}$ is the number of selected resources for semi-persistent scheduling as defined in 3GPP 38.321.
7. If the number of identified candidate radio resource subframes in the set of Sb is smaller than 0.2* $M_{total}$, then the Th(a, b) in the step 4 is increased by 3 dB.
8. For the remaining $R_{x,y}$ subframe resources in the set Sa, the metric $E_{x,y}$ is defined as an average S-RSSI in subchannel x+k for k=0, . . . , L−1 in the subframe resource ty−Pstep*j.
9. The UE moves the candidate resources having the smallest $E_{x,y}$ from Sa to Sb such that the number of available subframe resource in the Sb reaches 0.2*$M_{total}$.
10. In the case of multi carriers, the UE removes subframe resources $R_{x,y}$ from Sb when the UE does not support the multi-carriers feature.

The UE reports the set Sb to higher layers.

In NR V2X Mode 2 in Rel-16, the LTE V2X Mode 4 is enhanced by supporting, e.g., different V2X traffic types, such as aperiodic traffic and periodic traffic, and different cast communications, i.e., broadcast, unicast and groupcast. The radio resource selection procedure in NR-V2X Mode 2 according to 3GPP 38.214 is now described in more detail.

When reporting subframe resources that may be used by a higher layer for control or data transmission, the UE considers some parameters, e.g., the priority for reception and transmission, a configured resource pool, a packet delay budget, a radio resource reservation. For example, the UE considers the following parameters during the subframe resource selection process:

T2min_SelectionWindow:
   The minimum time that is used in the resource selection window and configured by higher layers.
SL-ThresRSRP_pi_pj:
   The RSRP threshold for the received priority pi in SCI format 0-1, and for the transmission priority pj configured by the higher layer.
RSRP for sensing:
   This determines that the RSRP in the control or data channels is taken into consideration.
T0_Sensing_Window:
   This is the number of measured slots that are considered during the candidate resource selection process.
reservationPeriodAllowed
   Besides, $Prsvp_{TX}$ is a transmission reservation period, which may be converted to the logical slot, $P'rsvp_{tx}$, when it is needed.

Similar to LTE V2X Mode 4 (see 3GPP 36.213), in NR V2X Mode 2 (see 3GPP 38.214) the resource selection process is performed as follows:

1. The UE selects a time-frequency resource, $R_{x,y}$, for transmission, where it consists of L contiguous radio resources starting from x+j, wherein j=0,1 . . . L−1. The UE selects a slot with respect to the resource pool between [n+T1, n+T2], where the T1 and T2 values are up to UE implementation, and T2 may be between $T2_{min}$ and the packed delay budget, PDB, time when $T2_{min}$ is configured. Otherwise, it is set to the remaining PDB. $M_{total}$ is the total number of available radio resources for the transmission.

2. The UE monitors the slots within the sensing window, as mentioned earlier.
3. Th(pri) is the received signal strength associated with QoS requirements of the application and configured by the higher layer.
4. All radio resources comprise a set of Sa.
5. The UE excludes $R_{x,y}$ from Sa when the following conditions are met:
   a. The UE has not monitored the slot.
   b. SCI format 0-1 indicates that the 'Resource Reservation period' is set, and no subchannels are available for a particular slot.
   c. SCI format 0-1 indicates that the radio resources are reserved, and the priority value is higher than the transmission priority.
   d. The measured RSRP value is higher than Th (pri-or$_{RX}$) received in SCI format 0-1.
   e. When the 'Resource Reservation Period' field is set on the received SCI format 0-1 at the $t_{m+q}$*P'rsvp$_{RX}$ which overlaps with $R_{x,y}$+jP'rsvp$_{TX}$ where q=1, 2, . . . , Q and j=0,1,2, . . . , $C_{resel}$−1. The P'rsvp$_{RX}$ is a logical slot that is obtained from Prsvp$_{RX}$ and Q=Roof(Tscal/Prscvp$_{RX}$) if Rrsvp$_{RX}$ <Tscal, where Tscal is the remaining time to the packet delay budget, and n'≤m+P'rsvp$_{RX}$, where n=n' when slot n belongs to the reserved transmission time period, otherwise it is the first slot after n in the range of configured transmission slots.
   f. When the number of candidate slot resources is less than 0.2*$M_{total}$, then Th(pri) is increased by 3 db, and the resource selection procedure is initiated from Step 4.

The UE reports the Sa to the higher layers.

Figure 5:
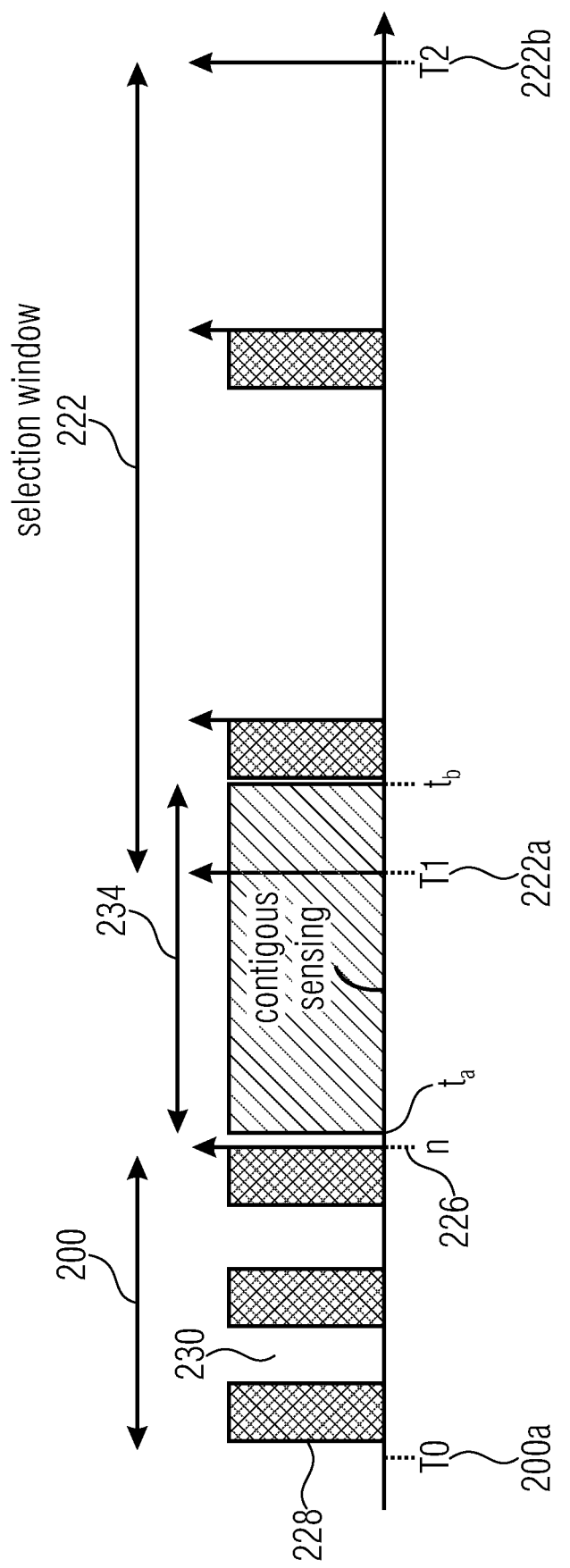
FIG. 5 illustrates an example of contiguous partial sensing in a power saving V-UE

Different resource selection strategies, such as partial sensing, random and normal sensing, are allowed within a resource pool when it is configured. However, a power-saving user may select a radio resource reserved by another nearby UE, like a V-UE, resulting in a collision. To avoid such a collision, in addition to the preemption and reevaluation feature at the V-UE user, the power saving user may use contiguous partial sensing to reduce collision due to aperiodic traffic generated by other power-saving users. FIG. 5 illustrates an example of contiguous partial sensing in a power saving V-UE. By contiguous partial sensing, a power-saving user may continue contiguous sensing immediately after the resource selection triggering time n at 226 until up to the actual resource transmission time T2. In FIG. 5, during the sensing window 220 the UE performs sensing in the subframes or time slots 228 and performs no sensing in the subframes or time slots 230. At 226, the continuous sensing window 234 having a size from $t_a$ to $t_b$. During the continuous sensing window 234 the UE continuously senses for resources. This way, a power saving UE may identify the resources that nearby power saving users may reserve.

The above described approaches, while addressing some power consumption issues still do not provide for power savings needed, e.g., by battery driven UEs transmitting/receiving over the SL, like V2X UEs.

Embodiments of the present invention provides improvements and enhancements by leveraging the current resource selection strategies and elaborating different conditions triggering different selection strategies, like random or partial sensing with a different number of sensing measurements to prolong the battery life, power-saving users. Embodiments of the present invention avoid problems that the use of a resource pool supporting different resource selection strategies leads to an increase in the probability of a collision between users with different resource selection strategies, and provide for a selection of an appropriate resource selection strategy to save energy while maintaining reliability and latency. Embodiments of the present invention provide approaches for an energy efficient resource selection. More specifically, embodiments provide improvements for the resource selection process for power-saving users in NR Sidelink related to random resource selection, partial sensing or sensing, while certain embodiments also consider Discontinuous Reception, DRX.

Embodiments of the invention proposes mechanisms to reduce the UE's power consumption, e.g., based on the decision whether random selection or sensing or partial sensing is to be applied, e.g., with an optimum number of sensing instances. The following embodiments or aspects concern techniques to leverage a current resource selection and to reduce the energy consumption for power-saving users:

Embodiment 1:
  Random selection for periodic or aperiodic traffic based on traffic/user density.
Embodiment 2:
  Random Resource Selection for a power-saving user in a resource pool configured for random- and sensing-based resource selection.
Embodiment 3:
  Resource Selection based on a received ACK/NACK.
Embodiment 4:
  Contiguous-partial sensing triggering conditions.
Embodiment 5:
  Adaptive contiguous partial-sensing for a power-saving user.
Embodiment 6:
  UE power saving based on the absolute or the relative UE position
Embodiment 7:
  Sensing extension and DRX-On-Off adaption.

Embodiments of the present invention are advantageous as the partial sensing and random resource selection and DRX on/off duration on the sidelink lead to a reduction of the UE's power consumption. Power saving for battery-based UEs using V2X applications—typically related to V2X security—is the highly advantageous to ensure that UEs do not run out of battery. Also, reliability improvements and latency reductions are catered to power-saving users.

Figure 6:
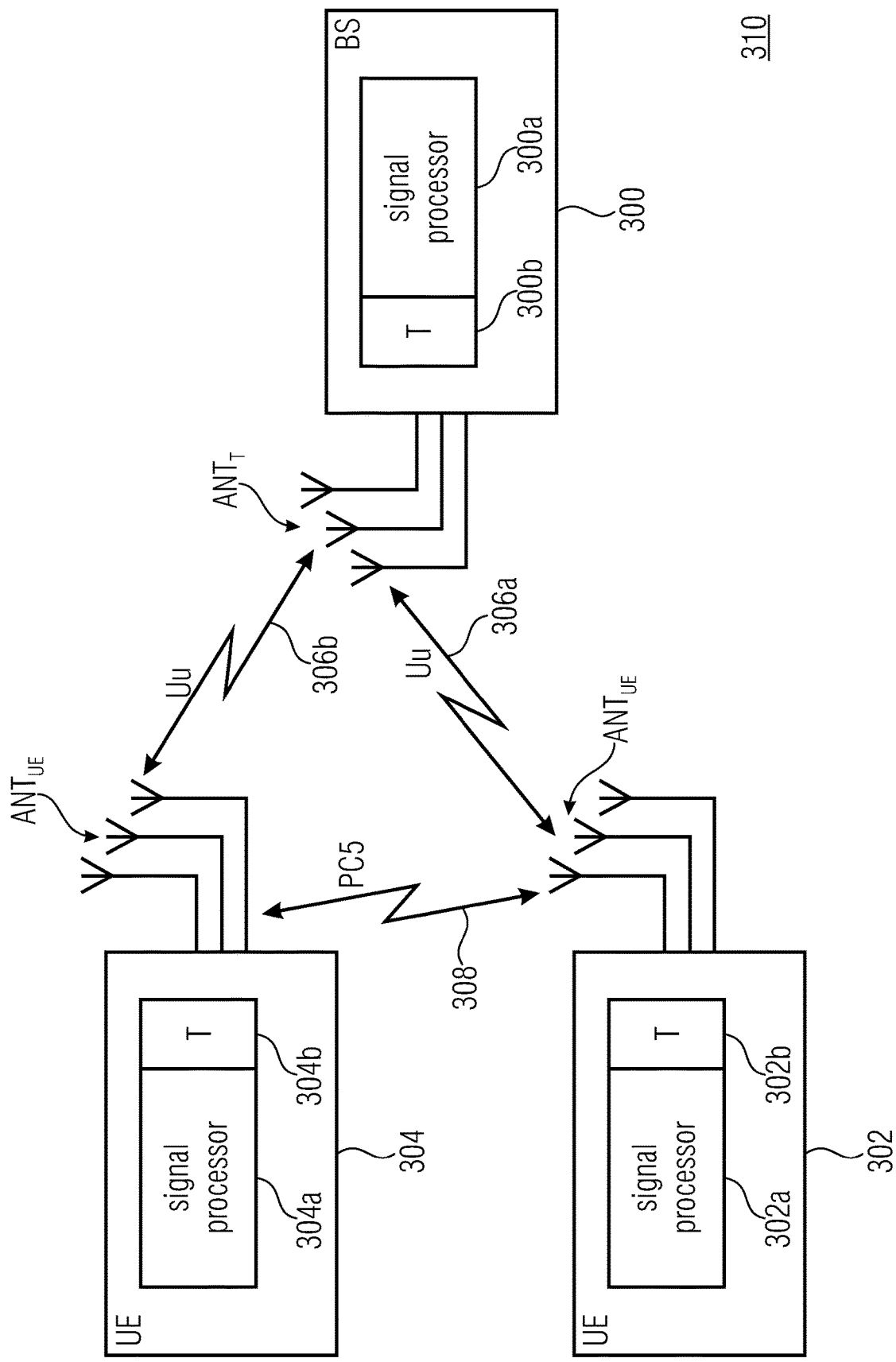
FIG. 6 is a schematic representation of a wireless communication system including a transmitter, like a base station, one or more receivers, like user devices, UEs, for implementing embodiments of the present invention.

Embodiments of the present invention may be implemented in a wireless communication system as depicted above including base stations and users, like mobile terminals or IoT devices. FIG. 6 is a schematic representation of a wireless communication system including a transmitter 300, like a base station, and one or more receivers 302, 304, like user devices, UEs. The transmitter 300 and the receivers 302, 304 may communicate via one or more wireless communication links or channels 306a, 306b, 308, like a radio link. The transmitter 300 may include one or more antennas ANT$_T$ or an antenna array having a plurality of antenna elements, a signal processor 300a and a transceiver 300b, coupled with each other. The receivers 302, 304 include one or more antennas ANT$_{UE}$ or an antenna array having a plurality of antennas, a signal processor 302a, 304a, and a transceiver 302b, 304b coupled with each other. The base station 300 and the UEs 302, 304 may communicate via respective first wireless communication links 306a and 306b, like a radio link using the Uu interface, while the UEs 302, 304 may communicate with each other via a second wireless communication link 308, like a radio link using the PC5/sidelink, SL, interface. When the UEs are not served by the base station or are not connected to a base station, for example, they are not in an RRC connected state, or, more generally, when no SL resource allocation configuration or assistance is provided by a base station, the UEs may communicate with each other over the sidelink, SL. The system or network of FIG. 6, the one or more UEs 302, 304 of FIG. 6, and the base station 300 of FIG. 6 may operate in accordance with the inventive teachings described herein.

APPARATUS

Embodiment 1

The present invention provides a user device, UE, for a wireless communication network, the wireless communication network including a plurality of user devices, UEs, wherein the UE is to communicate with one or more further user devices, UEs, of the wireless communication network over a sidelink, wherein, responsive to a trigger for a transmission, the UE is to perform a sensing process for determining resources to be used for the transmission, the sensing process comprising a plurality of radio resource selection processes, and wherein the UE is to select from the plurality of radio resource selection processes the radio resource selection process to be applied dependent on one or more of the following:
  a traffic density,
  a traffic density of different types of traffic,
  a user density within a predefined area around the UE.

In accordance with embodiments, the UE is to determine the traffic density and/or a user density using a measurement of one or more channel metrics, like the Channel Busy Ratio, CBR, during a predefined period before a start of the radio resource selection process.

In accordance with embodiments, the UE is to
  perform the measurement of the one or more channel metrics, and/or
  obtains the measurement of the one or more channel metrics form one or more network entities within the predefined area, e.g., from one or more of the further UEs via an inter-UE signaling, or from a roadside unit, RSU, operating in mode 2, or from a base station, like a gNB, operating in Mode 1.

In accordance with embodiments, the UE is to select the resources from a resource pool of the wireless communication network that is shared by the plurality of user devices, wherein the resource pool is to be used for some or all of the plurality of radio resource selection processes.

In accordance with embodiments, the plurality of radio resource selection processes comprise:
  a random radio resource selection,
  a regular sensing-based radio resource selection, and
  a partial sensing-based radio resource selection.

In accordance with embodiments, the different types of traffic comprise:
  periodic traffic, and
  aperiodic traffic.

In accordance with embodiments, the UE is to select the random radio resource selection or the partial sensing-based radio resource selection or the regular sensing-based radio resource selection, when
  a density of the periodic traffic is at or below a first threshold, and
  a density of the aperiodic traffic is at or above a second threshold, the second threshold being higher than the first threshold, and
  a user density is at or below a third threshold.

In accordance with embodiments, the UE is to select the random radio resource selection or the partial sensing-based radio resource selection when the density of the traffic associated with random radio resource selection and the traffic associated with partial sensing-based radio resource selection, like the Channel Busy Ratio, CBR, is at or below a certain limit or threshold, wherein the limit or threshold may be preconfigured or configured by higher layer signaling, e.g., RRC, SIB, PC5-RRC signaling, received form one or more network entities, e.g., from a roadside unit, RSU, or from a base station, like a gNB.

Embodiment 2

The present invention provides a user device, UE, for a wireless communication network, the wireless communication network including a plurality of user devices, UEs, wherein the UE is to communicate with one or more further user devices, UEs, of the wireless communication network over a sidelink, wherein the wireless communication network provides a resource pool that is shared by the plurality of user devices and that is to be used for some or all of a plurality of radio resource selection processes, and wherein, in case the UE is to perform a sensing process for determining resources to be used for a transmission using a certain radio resource selection process, like a random radio resource selection, responsive to a trigger for a transmission, the UE is not to perform the sensing process and is to select resources for the triggered transmission from a set of pre-defined resources within the resource pool.

In accordance with embodiments, resources for the set of predefined resources are selected from the resource pool dependent on one or more predefined criteria, e.g., dependent on one or more of the following:
  a quality of service, QoS, associated with the transmission,
  a priority of the transmission,
  a geographical area where the UE is located, e.g. a zone or minimum communication range, MCR, of the UE or a relative position of the UE or an absolute position of the UE,
  a traffic density,
  a user density within a predefined area around the UE,
  a type of the UE, e.g., a vehicular mounted UE or a battery-based UE.

In accordance with embodiments, the plurality of radio resource selection processes for which the resource pool is configured comprise at least or only:
  a random radio resource selection, and
  a regular sensing-based radio resource selection, and
wherein the certain radio resource selection process comprises the random radio resource selection.

In accordance with embodiments, the predefined resources comprise predefined time-frequency resources, and the UE is configured or preconfigured with the time-frequency resources, e.g., by higher layers through RRC or DCI or SCI signaling.

Embodiment 3

The present invention provides a user device, UE, for a wireless communication network, the wireless communication network including a plurality of user devices, UEs, wherein the UE is to communicate with one or more further user devices, UEs, of the wireless communication network over a sidelink, wherein, responsive to a trigger for a transmission, the UE is to perform a sensing process for determining resources to be used for the transmission, the sensing process comprising one of a plurality of radio resource selection processes, and wherein the UE is not to select or exclude resources as resources for the transmission which are associated with a feedback indicating a non-successful, earlier transmission on the resources.

In accordance with embodiments, the feedback comprises one or more NACK messages transmitted, e.g., by the intended receivers in unicast and multi-cast or by nearby UEs through an inter-UE coordination message.

In accordance with embodiments, the UE is to select the resources from a resource pool of the wireless communication network that is shared by the plurality of user devices, wherein the resource pool is to be used by each of the plurality of radio resource selection processes, wherein the plurality of radio resource selection processes may comprise:
- a random radio resource selection,
- a regular sensing-based radio resource selection, and
- a partial sensing-based radio resource selection.

Embodiment 4

The present invention provides a user device, UE, for a wireless communication network, the wireless communication network including a plurality of user devices, UEs, wherein the UE is to communicate with one or more further user devices, UEs, of the wireless communication network over a sidelink, wherein, responsive to a trigger for a transmission, the UE is to perform a sensing process for determining resources to be used for the transmission, and wherein the UE is to trigger a continuous partial sensing-based radio resource selection for selecting from the sensed resources responsive one or more predefined criteria being met.

In accordance with embodiments, the one or more predefined criteria comprise one or more of the following:
- an aperiodic traffic density exceeds a defined or specified threshold level,
- in case one or more quality of service, QoS, requirements are not met,
- the UE is located within or is approaching a certain geographical area, e.g., a geographical area where an increased number of aperiodic traffic is likely to be triggered.

In accordance with embodiments, the UE is to apply a partial sensing-based radio resource selection and switch to continuous partial sensing-based radio resource selection only when the one or more criteria are met.

In accordance with embodiments, in accordance with the contiguous partial sensing-based radio resource selection, the UE is to perform sensing, during a contiguous sensing window, after the trigger for the transmission until a predefined time before the transmission.

In accordance with embodiments, the UE is to select the resources from a resource pool of the wireless communication network that is shared by the plurality of user devices, wherein the resource pool is to be used by each of the plurality of radio resource selection processes, wherein the plurality of radio resource selection processes may comprise one or more of the following:
- a random radio resource selection,
- a regular sensing-based radio resource selection, and
- a partial sensing-based radio resource selection.

Embodiment 5

The present invention provides a user device, UE, for a wireless communication network, the wireless communication network including a plurality of user devices, UEs, wherein the UE is to communicate with one or more further user devices, UEs, of the wireless communication network over a sidelink, wherein, responsive to a trigger for a transmission, the UE is to perform a sensing process for determining resources to be used for the transmission, the sensing process comprising a continuous partial sensing-based radio resource selection, and wherein a size of a contiguous sensing window during the continuous partial sensing-based radio resource selection is set dependent on one or more predefined criteria.

In accordance with embodiments, the one or more predefined criteria comprise one or more of the following:
- one or more quality of service, QoS, requirements associated with the transmission,
- one or more transmission parameters, e.g., a HARQ feedback channel configuration,
- other parameters, like relative or absolute speed of the UE.

In accordance with embodiments, in accordance with the contiguous sensing window starts at a predefined time before or after the trigger for the transmission ends at a predefined time before the transmission.

In accordance with embodiments, the UE is to select the resources from a resource pool of the wireless communication network that is shared by the plurality of user devices, wherein the resource pool is to be used by each of the plurality of radio resource selection processes, wherein the plurality of radio resource selection processes may comprise one or more of the following:
- a random radio resource selection,
- a regular sensing-based radio resource selection, and
- a partial sensing-based radio resource selection.

Embodiment 6

The present invention provides a user device, UE, for a wireless communication network, the wireless communication network including a plurality of user devices, UEs, wherein the UE is to communicate with one or more further user devices, UEs, of the wireless communication network over a sidelink, and wherein, dependent on a position of the UE, the UE is to perform or is not to perform or is to modify a least one or more operations associated with a sidelink communication.

In accordance with embodiments, one or more operations associated with the sidelink communication comprise one or more of the following:
- a sensing process for determining resources to be used for a triggered transmission,
- a resource selection for a triggered transmission,
- a triggered transmission,
- a reception of a transmission,
- a signal processing,
- a Discontinuous Reception, DRX, mode.

In accordance with embodiments, the position of the UE is an absolute position and/or a relative position, and wherein the position of the UE is based on one or more of the following:
- a geographic or absolute position, e.g. based on a Global Navigation Satellite System, GNSS,
- a relative position or distance, e.g., a certain distance to a road or to an intersection or to a road side unit, RSU, or to another UE,
- a geographical area, e.g., one or more zones, e.g., identified by a zone ID.

In accordance with embodiments,
when the UE is at or is approaching a first location, the UE is not to perform or modify the least one or more operations associated with the sidelink communication, and
when the UE is at or is approaching a second location, the UE is resume the least one or more operations associated with the sidelink communication.

In accordance with embodiments,
at the first location comprises an area where no sidelink, SL, service, like a V2X service, is needed, and
at the second location comprises an area where a sidelink, SL, service, like a V2X service, is needed.

In accordance with embodiments, the UE is to communicate with one or more further network entities of the wireless communication network, like a base station, over the Uu interface, and wherein, dependent on the position of the UE, the UE is to perform or is not to perform or modify a least one or more operations associated with the Uu interface.

Embodiment 7

The present invention provides a user device, UE, for a wireless communication system, the wireless communication system including a plurality of user devices, UEs, wherein the UE is to communicate with one or more further user devices, UEs, of the wireless communication network over a sidelink, wherein the UE is to operate in a Discontinuous Reception, DRX, mode, wherein, responsive to a trigger for a transmission, the UE is to perform a sensing process for determining resources to be used for the transmission, and wherein the UE is configured or preconfigured with a parameter causing, responsive to the trigger for the transmission, an extension of a default ON duration of the DRX cycle in accordance with a sensing window for the sensing process, the sensing window having a size or duration mandated by the triggered transmission.

In accordance with embodiments, the default ON duration of the DRX cycle comprises a default start time and a default end time, and wherein the extension of the default ON duration comprises one or more of the following to ensure that the UE is capable to perform the sensing process for the mandated sensing window size:
an offset of the default end time to a later time,
an offset of the default start time to an earlier time.

In accordance with embodiments, the UE is configured or preconfigured with the parameter by RRC or PC5-RRC signaling or by a DCI or by a SCI or by a MAC signaling.

In accordance with embodiments, the UE is configured or preconfigured with a plurality of parameters, each parameter defining a different extension of the ON duration, and wherein the UE is to select a parameter to be applied dependent on one or more predefined criteria.

In accordance with embodiments, the one or more predefined criteria comprise one or more of the following:
one or more quality of service, QoS, requirements associated with the transmission,
one or more transmission parameters, e.g., a HARQ, feedback channel configuration,
a priority of the transmission,
a geographical area where the UE is located, e.g. a zone or minimum communication range, MCR, of the UE or a relative position of the UE or an absolute position of the UE,
a traffic density,
a user density within a predefined area around the UE,
a type of the UE, e.g., a vehicular mounted UE or a battery-based UE.

The present invention provides a user device, UE, for a wireless communication system, the wireless communication system including a plurality of user devices, UEs, wherein the UE is to communicate with one or more further user devices, UEs, of the wireless communication network over a sidelink, wherein the UE is to operate in a Discontinuous Reception, DRX, mode, wherein, responsive to a trigger for a transmission, the UE is to perform a sensing process for determining resources to be used for the transmission, the sensing process comprising a continuous partial sensing-based radio resource selection process, and wherein the UE is to adapt a contiguous sensing window so as to start the continuous partial sensing-based radio resource selection process prior to a start of a DRX ON duration.

In accordance with embodiments, the UE is to determine a time prior to the start of the DRX ON duration at which the contiguous sensing window is to start on the basis of one or more parameters associated with the triggered transmission, like QoS or priority associated with the transmission.

General

In accordance with embodiments, the UE is to communicate with
one or more further UEs using a sidelink, SL, interface, like a PC5 interface, and/or
one or more radio access network, RAN, entities of the wireless communication system, like one or more base stations, using a radio interface, like a Uu interface, or using a shared access band, like an unlicensed band.

System

The present invention provides a wireless communication system, comprising one or more of the inventive user devices, UEs.

Method

Embodiment 1

The present invention provides a method for operating a user device, UE, for a wireless communication network, the wireless communication network including a plurality of user devices, UEs, wherein the UE is to communicate with one or more further user devices, UEs, of the wireless communication network over a sidelink, the method comprising: responsive to a trigger for a transmission, performing a sensing process for determining resources to be used for the transmission, the sensing process comprising a plurality of radio resource selection processes, and selecting from the plurality of radio resource selection processes the radio resource selection process to be applied dependent on one or more of the following:
a traffic density,
a traffic density of different types of traffic,
a user density within a predefined area around the UE.

Embodiment 2

The present invention provides a method for operating a user device, UE, for a wireless communication network, the wireless communication network including a plurality of user devices, UEs, wherein the UE is to communicate with one or more further user devices, UEs, of the wireless communication network over a sidelink, wherein the wireless communication network provides a resource pool that is shared by the plurality of user devices and that is to be used for some or all of a plurality of radio resource selection processes, the method comprising: in case the UE is to perform a sensing process for determining resources to be used for a transmission using a certain radio resource selection process, like a random radio resource selection, responsive to a trigger for a transmission, not performing the sensing process and selecting resources for the triggered transmission from a set of predefined resources within the resource pool.

Embodiment 3

The present invention provides a method for operating a user device, UE, for a wireless communication network, the wireless communication network including a plurality of user devices, UEs, wherein the UE is to communicate with one or more further user devices, UEs, of the wireless communication network over a sidelink, the method comprising: responsive to a trigger for a transmission, performing a sensing process for determining resources to be used for the transmission, the sensing process comprising one of a plurality of radio resource selection processes, and not selecting or excluding resources as resources for the transmission which are associated with a feedback indicating a non-successful, earlier transmission on the resources.

Embodiment 4

The present invention provides a method for operating a user device, UE, for a wireless communication network, the wireless communication network including a plurality of user devices, UEs, wherein the UE is to communicate with one or more further user devices, UEs, of the wireless communication network over a sidelink, the method comprising: responsive to a trigger for a transmission, performing a sensing process for determining resources to be used for the transmission, and triggering a continuous partial sensing-based radio resource selection for selecting from the sensed resources responsive one or more predefined criteria being met.

Embodiment 5

The present invention provides a method for operating a user device, UE, for a wireless communication network, the wireless communication network including a plurality of user devices, UEs, wherein the UE is to communicate with one or more further user devices, UEs, of the wireless communication network over a sidelink, the method comprising: responsive to a trigger for a transmission, performing a sensing process for determining resources to be used for the transmission, the sensing process comprising a continuous partial sensing-based radio resource selection, and setting a size of a contiguous sensing window during the continuous partial sensing-based radio resource selection dependent on one or more predefined criteria.

Embodiment 6

The present invention provides a method for operating a user device, UE, for a wireless communication network, the wireless communication network including a plurality of user devices, UEs, wherein the UE is to communicate with one or more further user devices, UEs, of the wireless communication network over a sidelink, the method comprising: dependent on a position of the UE, performing or not performing or modifying a least one or more operations associated with a sidelink communication.

Embodiment 7

The present invention provides a method for operating a user device, UE, for a wireless communication system, the wireless communication system including a plurality of user devices, UEs, wherein the UE is to communicate with one or more further user devices, UEs, of the wireless communication network over a sidelink, and wherein the UE is to operate in a Discontinuous Reception, DRX, mode, the method comprising: responsive to a trigger for a transmission, performing a sensing process for determining resources to be used for the transmission, and causing, responsive to the trigger for the transmission and in accordance with a configured or preconfigured parameter, an extension of a default ON duration of the DRX cycle in accordance with a sensing window for the sensing process, the sensing window having a size or duration mandated by the triggered transmission.

The present invention provides a method for operating a user device, UE, for a wireless communication system, the wireless communication system including a plurality of user devices, UEs, herein the UE is to communicate with one or more further user devices, UEs, of the wireless communication network over a sidelink, and wherein the UE is to operate in a Discontinuous Reception, DRX, mode, the method comprising: responsive to a trigger for a transmission, performing a sensing process for determining resources to be used for the transmission, the sensing process comprising a continuous partial sensing-based radio resource selection process, and adapting a contiguous sensing window so as to start the continuous partial sensing-based radio resource selection process prior to a start of a DRX ON duration.

Computer Program Product

Embodiments of the present invention provide a computer program product comprising instructions which, when the program is executed by a computer, causes the computer to carry out one or more methods in accordance with the present invention.

Embodiment 1: Random Selection for Periodic or Aperiodic Traffic Based on Traffic/User Density Embodiments of a first aspect of the present invention provide a UE that may decide to choose random, sensing-based or partial sensing-based resource selection from a shared resource pool based on a traffic density measurement on different traffic types, e.g., a channel busy ratio, CBR, for periodic traffic, CBR_P, or for aperiodic traffic, CBR_A, and/or based on a measurement on a user density of the users performing random or partial sensing CBR_(R+P). The resource pool may be configured for random, sensing-based or partial sensing-based resource selection. For example, the UE may select, from the plurality of radio resource selection processes, the radio resource selection process that is to be used dependent on one or more of the following:
 a traffic density,
 a traffic density of different types of traffic,
 a user density within a predefined area around the UE.

In accordance with embodiments, the measurement is provided by a short-sensing, e.g., within 100 slots or less, before the resource selection is started, e.g., before the transmission is triggered at the UE. In accordance with other embodiments, the measurement information may be provided by other nearby UEs, e.g., using inter-UE signaling, or by a RSU operating in mode 2, or by a gNB operating in Mode 1. For example, with a CBR_P=10%, i.e., CBR for periodic traffic, a CBR_A=90%, i.e., CBR for aperiodic traffic, and users that are distributed sparsely, an algorithm may choose a random selection or partial sensing for the periodic traffic or for the aperiodic traffic, thereby refraining from performing regular sensing or adjusting a number of sensing instances dependent on the traffic density.

Figure 7:
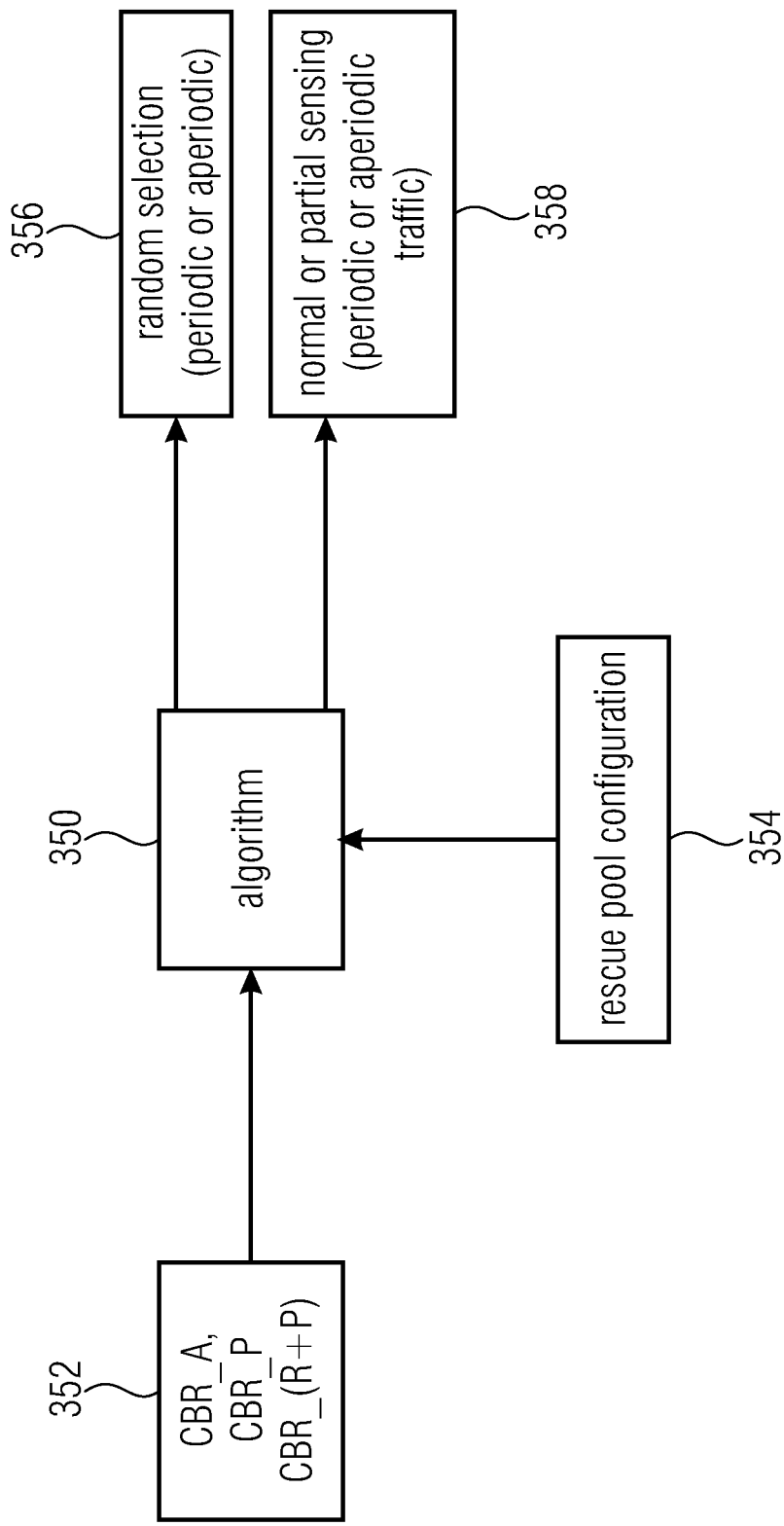
FIG. 7 illustrates a block diagram of a resource selection mechanism based on the traffic density in accordance with an embodiment of the present invention.

FIG. 7 illustrates a block diagram of a resource selection mechanism based on the traffic density in accordance with an embodiment. The above mentioned algorithm 350 is provided that receives as input the measurements CBR_P for periodic traffic, CBR_A for aperiodic traffic, and/or CBR_(R+P) for user density, as is indicated at 352, as well as the resource pool configuration 354. Using the input, the algorithm 350 selects random selection 356 or normal or partial sensing 358 and control the UE accordingly when performing the resource selection process.

In accordance with other embodiments, to limit the amount of random and partial sensing selection from a system-level perspective, a random or partial sensing resource selection may be selected when a corresponding CBR_(R+P) threshold of random or partial sensing selection traffic in one or more resource pools is below a certain limit. The corresponding threshold for the CBR_(R+P) may be configured or preconfigured by a higher layer signaling, e.g., by a RRC, SIB, PC5-RRC signaling, via a gNB, a RSU or another UE.

Embodiment 2: Random Resource Selection for a Power-Saving User in a Resource Pool Configured for Random- and Sensing-Based Resource Selection Embodiments of a second aspect of the present invention provide approaches avoiding collisions between UEs using different resource selection processes within a common resource pool.

In accordance with embodiments, one or more resource pools may be configured for random resource selection and for sensing-based resource selection. Conventionally, two users performing random selection may collide due to transmission on the same radio resources. To avoid such a collision, according to embodiments, a random selection-based user may select the radio resources from a set of predefined radio resources within the resource pool. This may be used for aperiodic traffic or for periodic traffic. Stated differently, responsive to a trigger for a transmission, the UE does not perform the sensing process but selects the resources for the triggered transmission from the set of predefined resources within the resource pool. Thus, a random selection based user refrains to perform sensing and transmits on a predefined resources thereby avoiding a collision among all random selection-based users.

For example, one or more of the following parameters may be taken into consideration in the configuration of the radio resource selection for the random selection-based users, i.e., for selecting the set of predefined resources from the resource pool:
a quality of service, QoS, associated with the transmission,
a priority of the transmission,
a geographical area where the UE is located, e.g. a zone or minimum communication range, MCR, of the UE or a relative position of the UE or an absolute position of the UE,
a traffic density,
a user density within a predefined area around the UE,
a type of the UE, e.g., a vehicular mounted UE or a battery-based UE.

For example, a random selection-based user with periodic traffic may be configured to transmit only on the preconfigured frequency-time resources. This way, the collision among the random selection-based users is avoided. In accordance with embodiments, the reevaluation and preemption features are only configured for normal sensing users so that the normal sensing users may pre-empt the radio resources or, in the reevaluation, when it is configured, may re-select the radio resources reserved by the power-saving users.

The time-frequency resources may be configured or preconfigured by the higher layers, e.g., through RRC or DCI or SCI signaling.

Embodiment 3: Resource Selection Based on a Received ACK/NACK

Embodiments of a third aspect of the present invention provide a power-saving user performing resource selection and considering whether a transmission has not been successfully received. For example, when enabled, the UE may consider a non-acknowledgement, NACK, feedback that causes a resource re-selection or re-transmission.

For example, when a resource pool, RP is configured for random, partial, and regular sensing-based resource selection, a power-saving user performing resource selection may consider a NACK feedback for a resource re-selection or re-transmission, and the power-saving UE excludes those resources on which NACK messages were received and trigger a re-selection or a re-transmission.

The NACK messages may be received from the intended receiver of the transmission in unicast and multi-cast or may be indicated by nearby users through an inter-UE coordination message.

Embodiment 4: Contiguous-Partial Sensing Triggering Conditions

Embodiments of a fourth aspect of the present invention provide approaches for mitigating a collision among UEs using different resource selection processes by selectively allowing the UE to switch to contiguous partial sensing, e.g. based on certain conditions.

In the art it was agreed so far to use contiguous partial sensing to mitigate the collision among partial sensing- and normal sensing-based users, particularly in the case of aperiodic traffic. A described above with reference to FIG. 5, when applying contiguous partial sensing, a UE performs sensing immediately after resource selection triggering time in the contiguous partial sensing, and it ends just before the transmission. Although the contiguous partial sensing may increase power consumption at the power saving UEs due to extending the sensing duration, the reliability increases as more sensing information are used during resource selection.

Embodiment of the present invention provide a compromise between reliability and power consumption for the power-saving users, by allowing a power-saving UE to trigger the contiguous partial sensing based certain conditions or criteria, like one or more of the following conditions:
- an aperiodic traffic density exceeds a defined or specified threshold level,
- in case one or more quality of service, QoS, requirements are not met,
- the UE is located within or is approaching a certain geographical area, e.g., a geographical area where an increased number of aperiodic traffic is likely to be triggered.

In accordance with embodiments, a power-saving UE may perform contiguous partial sensing when the aperiodic traffic density exceeds a defined or specified threshold level. For example, the aperiodic traffic density may be derived from a sensing measurement, e.g., from a CBR.

In accordance with other embodiments, a power-saving UE may perform contiguous partial sensing due to the QoS requirements, for example, when a QoS is not met by periodic partial sensing.

In accordance with yet further embodiments, a power-saving UE may trigger contiguous partial sensing when the UE is located within or approaching a geographical area where an increasing number of aperiodic traffic is likely to be triggered.

Embodiment 5: Adaptive Contiguous Partial-Sensing for a Power-Saving User

Embodiments of a fifth aspect of the present invention provide approaches allowing a UE performing a continuous partial sensing-based radio resource selection to adjust or set a size of a contiguous sensing window during the continuous partial sensing-based radio resource selection dependent on one or more predefined criteria.

In accordance with embodiments, a resource pool may be configured for different radio resource selection strategies, like sensing-based, random and partial sensing-based. However, some partial sensing users and random selection based power saving users may increase the collision due to the lack of knowledge of resource allocation of other UEs or applications. FIG. 5 illustrates the contiguous partial sensing used to reduce collision among these users, especially when aperiodic traffic is dominant. However, conventionally, the size of the contiguous sensing window 234 is determined by predefined values indication a start time and an end time of the contiguous sensing window 234.

For example, the sensing in the contiguous partial sensing may start before the time 226 at which the resource selection or the transmission is triggered, i.e., at n–$t_a$, or immediately after the time 226, i.e., n+$t_a$. The end time $t_b$ may be selected from a range of values up to the maximum delay allowed by the application layer, i.e., the packet delay budget.

In accordance with embodiments, a size $t_b$–$t_a$ of the contiguous sensing window 234 may be set or adjusted or configured dependent on one or more predefined criteria, such as one or more of the following:
- one or more quality of service, QoS, requirements associated with the transmission,
- one or more transmission parameters, e.g., a HARQ feedback channel configuration,
- other parameters, like relative or absolute speed of the UE.

For example, the size $t_b$–$t_a$ of the contiguous sensing window 234 may be is configured by:

$$(t_b, t_a) = f(\text{QoS}, \text{transmission parameters}), n - T_{0,proc} - T < t_a < n + t_b - T0_{proc}$$

where
$T_{0,proc}$ is processing time
T may be any value, for example, in a range of 0 to 32 or 100 slots or milliseconds n<$t_b$<$t_y$–$T_{0,proc}$, where $t_y$ is a selected time-frequency resource for the data transmission from [T1, T2].

Embodiment 6: UE Power Saving Based on the Absolute or the Relative UE Position Embodiments of a sixth aspect of the present invention provide approaches allowing a UE to decide, dependent on a position of the UE, whether to perform or not to perform or to modify a least one or more operations associated with a sidelink communication, for example one or more of the following:
- a sensing process for determining resources to be used for a triggered transmission,
- a resource selection for a triggered transmission,
- a triggered transmission,
- a reception of a transmission,
- a signal processing,
- a Discontinuous Reception, DRX, mode.

In accordance with embodiments, to reduce a power consumption of a UE, V2X services and application may be could partly, e.g., for a certain time period or interval, or completely refrain from performing one or more of:
- partial or full sensing,
- resource selection and transmission,
- reception of transmissions,
- processing of messages, at least, e.g., for a V2X application.

This may be decided dependent on the UE's absolute or relative position, e.g., whenever the UE is not in proximity of traffic-related scenarios, e.g., dependent on a distance to an intersection and/or to a road.

Instead of refraining from signal reception or transmission, in case the UE operates in DRX, also the DRX configuration may be adapted dependent on the UE's absolute or relative position. For example, a timer may be adapted to increase a sleep mode in DRX.

In accordance with embodiments, the position of the UE is an absolute position and/or a relative position, and may be based on one or more of the following:
- a geographic or absolute position, e.g. based on a Global Navigation Satellite System, GNSS,
- a relative position or distance, e.g., a certain distance to a road or to an intersection or to a road side unit, RSU, or to another UE,
- a geographical area, e.g., one or more zones, e.g., identified by a zone ID.

In accordance with embodiments, the UE's absolute and/or relative position may be based on a geographic or absolute position, e.g., based on a GNSS or any other positioning method. For example, operations associated with a sidelink communication may be not performed inside a building where no V2X services are expected to be needed. That may typically relevant for battery-based UEs, e.g. P-UEs. Operations associated with a sidelink communication may also not be performed outdoors, when the geographical location is allocation where V2X traffic may be not relevant, e.g., in forests, in pedestrian zones.

In accordance with other embodiments, the UE's absolute and/or relative position may be based on a relative position or distance of the UE with regard to certain deices or locations. For examples, operations associated with a sidelink communication, e.g. V2X service, may be activated, e.g., in a P-UE, when being within a certain distance to a road or to an intersection or to a RSU, and may be deactivated when the UE is outside the certain distance. The relative distance to one or more other UEs, like V-UEs, may be considered, e.g. if there are no V-UEs in proximity which, e.g., may be determined from sidelink measurements, operations associated with a sidelink communication, e.g. V2X service, may be deactivated.

In accordance with yet other embodiments a geographical area, e.g. one or more zones, e.g., based on the zone IDs, may be employed by the UE to decide about activating/deactivating operations associated with a sidelink communication, e.g. V2X service. For example one or more zones may an indication or may be defined to be relevant or not relevant for V2X services or applications. A zone may also distinguish between different types of UE, e.g., pedestrian UE, a battery-based UE, a UE associated to a bike, a vehicular UE. A zone may be categorized regarding its relevance for V2X services or applications, e.g., highly relevant, medium relevant, low relevant, not relevant.

In accordance with embodiments, based on any of the above mentioned parameters concerning the location/position/distance/area associated with a UE, V2X services or applications may be completely refrain or may be stopped from any power-consuming activities, e.g., partial or full sensing, resource selection to perform transmission, reception, processing, at least related to V2X related services or applications.

In accordance with further embodiments, V2X applications or services may be set up or started or continued based on the geographical position/distance/area, e.g., when the UE approaches a V2X relevant area, like a road, an intersection or a vehicle.

In accordance with embodiments, with regard to the absolute position or the relative position, a distance to a traffic scenario may be based on a distance to, e.g., road side units, RSU, integrated in, e.g., traffic lights or traffic signs, or based on the distance to other UEs, e.g., UEs having an activated V2X service or application. To determine start and stop of V2X applications or services, a threshold may be introduced, especially with regard to the absolute position or the relative position. For example, when approaching an intersection, once a certain distance is determined, e.g., by comparing a distance to threshold of x meters, of a UE, like battery based UE, to an intersection, one or more V2X services or applications may be started or continued. On the other hand, when moving away from an intersection, the threshold may be used to determine when to switch off or reduce further power consuming activities related to V2X applications or services.

Embodiment 7: Sensing Extension and DRX-On-Off Adaption

Embodiments of a seventh aspect of the present invention provide a UE that operates in a Discontinuous Reception, DRX, mode, and which is configured or preconfigured with a parameter causing, responsive to the trigger for the transmission, an extension of a default ON duration of the DRX cycle in accordance with a sensing window for the sensing process, the sensing window having a size or duration mandated by the triggered transmission.

In accordance with embodiments, in NR V2X, a V-UE has to decode a first stage SCI to identify any free or unoccupied time-frequency resources received during a recent past sensing measurement or during the sensing window. The second stage of a two-stage SCI is multiplexed with the physical sidelink shared channel, PSSCH, and is decoded when the transmission is meant for a UE through an indication of a destination ID or a group ID. For a power saving UE with limited power source, decoding, sensing, receiving the data and transmitting data are the main factors contributing to power consumption.

The DRX feature supports the power saving UEs to save energy by switching off the RX chain for a time configured by the network. However, this may lead to a decrease of the power-saving UE's reliability as it may miss sensing information. Therefore, in accordance with embodiments, the reliability is increased by allowing the power-saving UE to perform sensing just before its transmission. For this purpose, a higher layer parameter, for example, a sensing during DRX-off time or an extension of the DRX-on duration, may be defined to mandate a power-saving UE to perform sensing and decoding before the transmission. The parameter may can be configured by RRC/PC5-RRC signaling or DCI configuration or SCI or MAC signaling.

The transition from active time to inactive time based on DRX may decrease the sensing results' accuracy. In accordance with embodiments, reliable sensing results while saving energy may be obtained by an extension of the DRX on-duration. For example, an offset duration may be provided to ensure that the UE is able to perform or continue sensing for the mandated duration. This offset value or sensing window time may also be based on QoS and geo-location parameters. The offset duration may be configured through RRC/PC5-RRC or DCI or SCI.

In accordance with other embodiments, reliable sensing results while saving energy may be obtained by starting the DRX on-duration earlier than configured. For example a transition from an active time to an inactive time may lead to the missing of sensing results. Hence, an offset duration is defined to ensure that the UE may start in advance with performing or continuing sensing for the mandated duration. This offset value or sensing window time may also be based on QoS and geo-location parameters. The offset duration may be configured through RRC/PC5-RRC or DCI or SCI.

In accordance with further embodiments, some V-UEs may send their radio resources, RR, reservation when other power-saving UEs are in sleep mode, i.e., in the DRX off duration. In such a case, a power-saving UE is not aware of the V-UE RR reservation when transitioning from sleep to active DRX mode and may therefore transmit on the radio resources used for transmission by V-UEs resulting in a collision. Embodiments of the present invention avoid such collision, by allowing a power-saving UE performing partial-or full sensing to adapt its sensing window, like the contiguous partial sensing window, and to start the sensing prior to the configured active time. The adaption may be based on additional criteria, e.g., a QoS or a priority associated with the transmission. This a-priori time-period ensures reliable sensing results before the power-saving users start transmission/reception on the active period.

General

Embodiments of the present invention have been described in detail above, and the respective embodiments and aspects may be implemented individually or two or more of the embodiments or aspects may be implemented in combination.

In accordance with embodiments, the wireless communication system may include a terrestrial network, or a non-terrestrial network, or networks or segments of networks using as a receiver an airborne vehicle or a spaceborne vehicle, or a combination thereof.

In accordance with embodiments, the user device, UE, described herein may be one or more of a power-limited UE, or a hand-held UE, like a UE used by a pedestrian, and referred to as a Vulnerable Road User, VRU, or a Pedestrian UE, P-UE, or an on-body or hand-held UE used by public safety personnel and first responders, and referred to as Public safety UE, PS-UE, or an IoT UE, e.g., a sensor, an actuator or a UE provided in a campus network to carry out repetitive tasks and needing input from a gateway node at periodic intervals, or a mobile terminal, or a stationary terminal, or a cellular IoT-UE, or a vehicular UE, or a vehicular group leader, GL, UE, or an IoT, or a narrowband IoT, NB-IoT, device, or a WiFi non Access Point STAtion, non-AP STA, e.g., 802.11ax or 802.11be, or a ground based vehicle, or an aerial vehicle, or a drone, or a moving base station, or a road side unit, or a building, or any other item or device provided with network connectivity enabling the item/device to communicate using the wireless communication network, e.g., a sensor or actuator, or any other item or device provided with network connectivity enabling the item/device to communicate using a sidelink the wireless communication network, e.g., a sensor or actuator, or any sidelink capable network entity.

The base station, BS, described herein may be implemented as mobile or immobile base station and may be one or more of a macro cell base station, or a small cell base station, or a central unit of a base station, or a distributed unit of a base station, or an Integrated Access and Backhaul, IAB, node, or a road side unit, or a UE, or a group leader, GL, or a relay, or a remote radio head, or an AMF, or an SMF, or a core network entity, or mobile edge computing entity, or a network slice as in the NR or 5G core context, or a WiFi AP STA, e.g., 802.11ax or 802.11be, or any transmission/reception point, TRP, enabling an item or a device to communicate using the wireless communication network, the item or device being provided with network connectivity to communicate using the wireless communication network.

Although some aspects of the described concept have been described in the context of an apparatus, it is clear that these aspects also represent a description of the corresponding method, where a block or a device corresponds to a method step or a feature of a method step. Analogously, aspects described in the context of a method step also represent a description of a corresponding block or item or feature of a corresponding apparatus.

Various elements and features of the present invention may be implemented in hardware using analog and/or digital circuits, in software, through the execution of instructions by one or more general purpose or special-purpose processors, or as a combination of hardware and software. For example, embodiments of the present invention may be implemented in the environment of a computer system or another processing system. FIG. 8 illustrates an example of a computer system 600. The units or modules as well as the steps of the methods performed by these units may execute on one or more computer systems 600. The computer system 600 includes one or more processors 602, like a special purpose or a general-purpose digital signal processor. The processor 602 is connected to a communication infrastructure 604, like a bus or a network. The computer system 600 includes a main memory 606, e.g., a random-access memory, RAM, and a secondary memory 608, e.g., a hard disk drive and/or a removable storage drive. The secondary memory 608 may allow computer programs or other instructions to be loaded into the computer system 600. The computer system 600 may further include a communications interface 610 to allow software and data to be transferred between computer system 600 and external devices. The communication may be in the from electronic, electromagnetic, optical, or other signals capable of being handled by a communications interface. The communication may use a wire or a cable, fiber optics, a phone line, a cellular phone link, an RF link and other communications channels 612.

The terms "computer program medium" and "computer readable medium" are used to generally refer to tangible storage media such as removable storage units or a hard disk installed in a hard disk drive. These computer program products are means for providing software to the computer system 600. The computer programs, also referred to as computer control logic, are stored in main memory 606 and/or secondary memory 608. Computer programs may also be received via the communications interface 610. The computer program, when executed, enables the computer system 600 to implement the present invention. In particular, the computer program, when executed, enables processor 602 to implement the processes of the present invention, such as any of the methods described herein. Accordingly, such a computer program may represent a controller of the computer system 600. Where the disclosure is implemented using software, the software may be stored in a computer program product and loaded into computer system 600 using a removable storage drive, an interface, like communications interface 610.

The implementation in hardware or in software may be performed using a digital storage medium, for example cloud storage, a floppy disk, a DVD, a Blue-Ray, a CD, a ROM, a PROM, an EPROM, an EEPROM or a FLASH memory, having electronically readable control signals stored thereon, which cooperate or are capable of cooperating with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention may be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier. In other words, an embodiment of the inventive method is, therefore, a computer program having a program code for performing one of the methods described herein, when the computer program runs on a computer.

A further embodiment of the inventive methods is, therefore, a data carrier, or a digital storage medium, or a computer-readable medium comprising, recorded thereon, the computer program for performing one of the methods described herein. A further embodiment of the inventive method is, therefore, a data stream or a sequence of signals representing the computer program for performing one of the methods described herein. The data stream or the sequence of signals may for example be configured to be transferred via a data communication connection, for example via the Internet. A further embodiment comprises a processing means, for example a computer, or a programmable logic device, configured to or adapted to perform one of the methods described herein. A further embodiment comprises a computer having installed thereon the computer program for performing one of the methods described herein.

In some embodiments, a programmable logic device, for example a field programmable gate array, may be used to perform some or all of the functionalities of the methods described herein. In some embodiments, a field programmable gate array may cooperate with a microprocessor in order to perform one of the methods described herein. Generally, the methods are performed by any hardware apparatus.

While this invention has been described in terms of several advantageous embodiments, there are alterations, permutations, and equivalents, which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

The invention claimed is:

1. A user device, UE, for a wireless communication system, the wireless communication system comprising a plurality of user devices, UEs,
   wherein the UE is to communicate with one or more further user devices, UEs, of the wireless communication network over a sidelink,
   wherein the UE is to operate in a Discontinuous Reception, DRX, mode,
   wherein, responsive to a trigger for a transmission, the UE is to perform a sensing process for determining resources to be used for the transmission, and
   wherein the UE is to receive a signaling comprising a parameter causing, responsive to the trigger for the transmission, an extension of a default ON duration of the DRX cycle in accordance with a sensing window for the sensing process, the sensing window having a size or duration mandated by the triggered transmission.

2. The user device, UE, of claim 1, wherein the default ON duration of the DRX cycle comprises a default start time and a default end time, and wherein the extension of the default ON duration comprises one or more of the following to ensure that the UE is capable to perform the sensing process for the mandated sensing window size:
   an offset of the default end time to a later time,
   an offset of the default start time to an earlier time.

3. The user device, UE, of claim 1, wherein the UE is configured or preconfigured with the parameter by RRC or PC5-RRC signaling or by a DCI or by a SCI or by a MAC signaling.

4. The user device, UE, of claim 1, wherein the UE is configured or preconfigured with a plurality of parameters, each parameter defining a different extension of the ON duration, and wherein the UE is to select a parameter to be applied dependent on one or more predefined criteria.

5. The user device, UE, of claim 4, wherein the one or more predefined criteria comprise one or more of the following:
   one or more quality of service, QoS, requirements associated with the transmission,
   one or more transmission parameters, e.g., a HARQ feedback channel configuration,
   a priority of the transmission,
   a geographical area where the UE is located, e.g. a zone or minimum communication range, MCR, of the UE or a relative position of the UE or an absolute position of the UE,
   a traffic density,
   a user density within a predefined area around the UE,
   a type of the UE, e.g., a vehicular mounted UE or a battery-based UE.

6. The user device, UE, of claim 1, wherein the UE is to communicate with
   one or more further UEs using a sidelink, SL, interface, like a PC5 interface, and/or
   one or more radio access network, RAN, entities of the wireless communication system, like one or more base stations, using a radio interface, like a Uu interface, or using a shared access band, like an unlicensed band.

7. The user device, UE, of claim 1, wherein the UE and/or the further UE comprise one or more of the following: a power-limited UE, or a hand-held UE, like a UE used by a pedestrian, and referred to as a Vulnerable Road User, VRU, or a Pedestrian UE, P-UE, or an on-body or hand-held UE used by public safety personnel and first responders, and referred to as Public safety UE, PS-UE, or an IoT UE, e.g., a sensor, an actuator or a UE provided in a campus network to carry out repetitive tasks and needing input from a gateway node at periodic intervals, a mobile terminal, or a stationary terminal, or a cellular IoT-UE, or a vehicular UE, or a vehicular group leader, GL, UE, or a sidelink relay, or an IoT or narrowband IoT, NB-IoT, device, or wearable device, like a smartwatch, or a fitness tracker, or smart glasses, or a ground based vehicle, or an aerial vehicle, or a drone, or a base station e.g. gNB, or a moving base station, or road side unit,RSU, or a building, or any other item or device provided with network connectivity enabling the item/device to communicate using the wireless communication network, e.g., a sensor or actuator, or any other item or device provided with network connectivity enabling the item/device to communicate using a sidelink the wireless communication network, e.g., a sensor or actuator, or a transceiver, or any sidelink capable network entity.

8. A wireless communication system, comprising one or more user devices, UEs, of claim 1.

9. The wireless communication system of claim 8, comprising one or more base stations, wherein the base station comprises one or more of a macro cell base station, or a small cell base station, or a central unit of a base station, or a distributed unit of a base station, or an integrated access and backhaul, IAB, node, or a road side unit, RSU, or a UE, or a group leader, GL, or a relay or a remote radio head, or an AMF, or an S1VIF, or a core network entity, or mobile edge computing, MEC, entity, or a network slice as in the NR or 5G core context, or any transmission/reception point, TRP, enabling an item or a device to communicate using the wireless communication network, the item or device being provided with network connectivity to communicate using the wireless communication network.

10. A method for operating a user device, UE, for a wireless communication system, the wireless communication system comprising a plurality of user devices, UEs, wherein the UE is to communicate with one or more further user devices, UEs, of the wireless communication network over a sidelink, and wherein the UE is to operate in a Discontinuous Reception, DRX, mode, the method comprising:
    responsive to a trigger for a transmission, performing a sensing process for determining resources to be used for the transmission, and receiving a signaling comprising a parameter causing, responsive to the trigger for the transmission, an extension of a default ON duration of the DRX cycle in accordance with a sensing window for the sensing process, the sensing window having a size or duration mandated by the triggered transmission.

11. A non-transitory digital storage medium having a computer program stored thereon to perform the method for operating a user device, UE, for a wireless communication system, the wireless communication system comprising a plurality of user devices, UEs, wherein the UE is to communicate with one or more further user devices, UEs, of the wireless communication network over a sidelink, and wherein the UE is to operate in a Discontinuous Reception, DRX, mode, the method comprising:

responsive to a trigger for a transmission, performing a sensing process for determining resources to be used for the transmission, and receiving a signaling comprising a parameter causing, responsive to the trigger for the transmission, an extension of a default ON duration of the DRX cycle in accordance with a sensing window for the sensing process, the sensing window having a size or duration mandated by the triggered transmission, when said computer program is run by a computer.

* * * * *